(12) United States Patent
Dyrlund et al.

(10) Patent No.: US 10,717,247 B2
(45) Date of Patent: Jul. 21, 2020

(54) APPARATUS AND METHOD FOR MANUFACTURING AN AIR MAINTENANCE TIRE

(71) Applicant: The Goodyear Tire & Rubber Company, Akron, OH (US)

(72) Inventors: Christopher David Dyrlund, Canton, OH (US); Andres Ignacio Delgado, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 228 days.

(21) Appl. No.: 15/972,278

(22) Filed: May 7, 2018

(65) Prior Publication Data

US 2018/0250901 A1    Sep. 6, 2018

Related U.S. Application Data

(62) Division of application No. 14/489,580, filed on Sep. 18, 2014, now abandoned.

(51) Int. Cl.

| | |
|---|---|
| *B29D 30/00* | (2006.01) |
| *B29D 30/06* | (2006.01) |
| *B60C 23/12* | (2006.01) |
| *B60C 23/10* | (2006.01) |
| *B29D 30/72* | (2006.01) |
| *B60C 23/00* | (2006.01) |
| *B60C 13/00* | (2006.01) |

(Continued)

(52) U.S. Cl.
CPC .......... *B29D 30/0681* (2013.01); *B60C 23/10* (2013.01); *B60C 23/12* (2013.01); *B29D 2030/0094* (2013.01); *B29D 2030/0612* (2013.01); *B29D 2030/728* (2013.01); *B60C 13/00* (2013.01); *B60C 13/02* (2013.01); *B60C 23/001* (2013.01); *B60C 23/0491* (2013.01); *B60C 2013/026* (2013.01)

(58) Field of Classification Search
CPC ............ B29D 30/0061; B29D 30/0681; B29D 2030/0072; B29D 2030/0083; B29D 2030/0094; B29D 2030/0612; B29D 2030/726; B29D 2030/728; B60C 23/001; B60C 23/0491; B60C 23/0493; B60C 23/0494; B60C 23/0496; B60C 23/10; B60C 23/12; B60C 23/14; B60C 13/00; B60C 13/02; B60C 2013/026; B60C 15/024
USPC ....................... 156/110.1, 111, 396; 152/523
See application file for complete search history.

(56) References Cited

U.S. PATENT DOCUMENTS

| | | | | |
|---|---|---|---|---|
| 1,451,344 A | * | 4/1923 | Robinett ................ | B60C 25/132 157/1.24 |
| 3,036,625 A | * | 5/1962 | Penkoff ................. | B60C 25/025 157/1.24 |

(Continued)

*Primary Examiner* — Robert C Dye
*Assistant Examiner* — Sedef E Paquette
(74) *Attorney, Agent, or Firm* — Edward T. Kennedy

(57) ABSTRACT

Apparatus and method for manufacturing an air maintenance tire includes an air pumping tube assembly station constructing an air pumping tube sub-assembly, a tire preparation station for forming passageways in the tire to accept an outlet device of the air pumping tube sub-assembly, an air pumping tube sub-assembly installation station and a pressure regulator installation station. The air pumping tube sub-assembly inserts into an elongate tire groove opening, facilitated by groove-spreading apparatus.

3 Claims, 28 Drawing Sheets

(51) Int. Cl.
B60C 23/04 (2006.01)
B60C 13/02 (2006.01)

(56) References Cited

U.S. PATENT DOCUMENTS

| | | | |
|---|---|---|---|
| 4,351,382 A * | 9/1982 | Corner | B60B 21/10 |
| | | | 152/379.4 |
| 2012/0125524 A1* | 5/2012 | Delgado | B29D 30/0681 |
| | | | 156/123 |
| 2013/0061996 A1* | 3/2013 | Delgado | B60C 23/12 |
| | | | 152/523 |
| 2013/0112328 A1* | 5/2013 | Hinque | B60C 19/002 |
| | | | 152/450 |

* cited by examiner

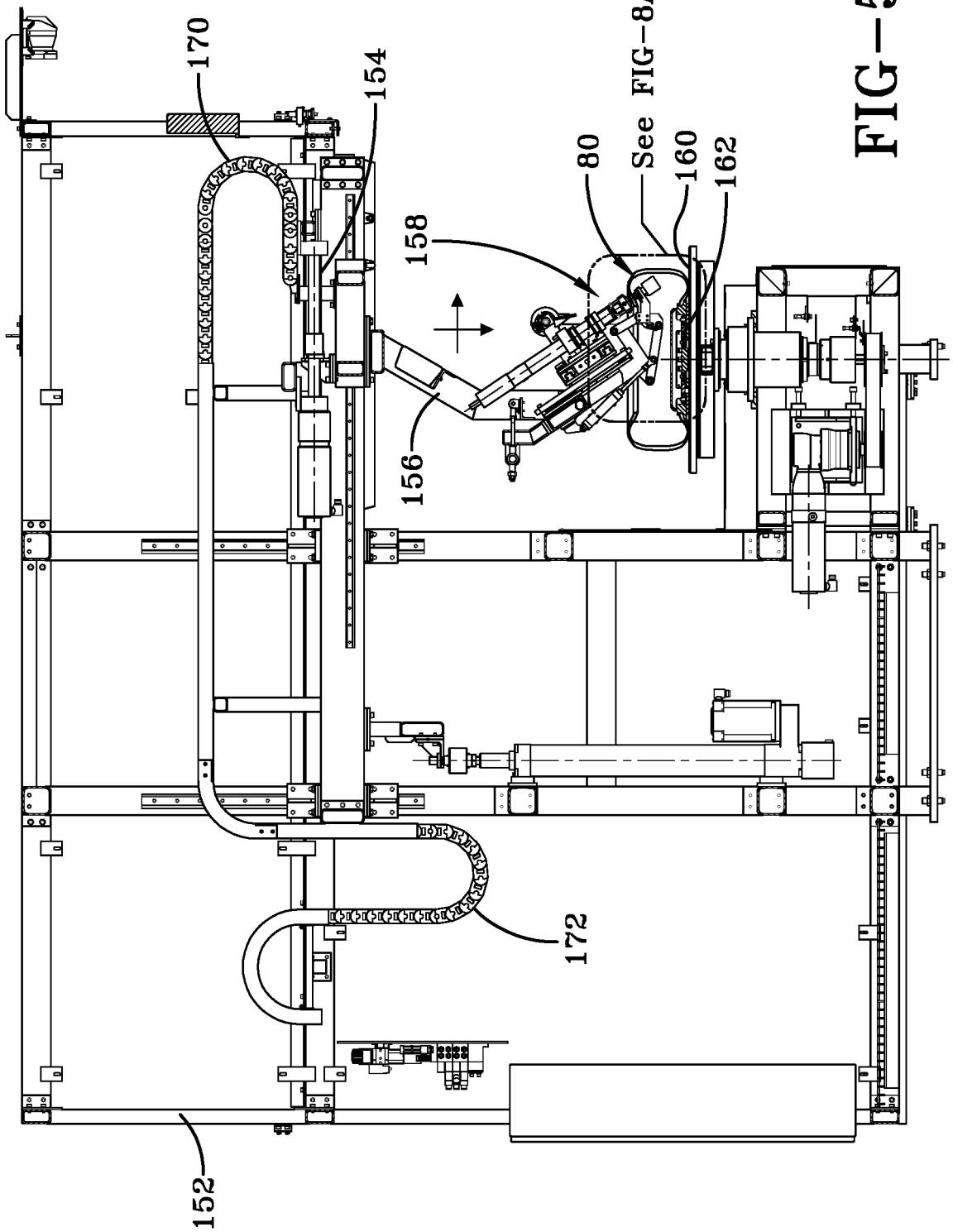

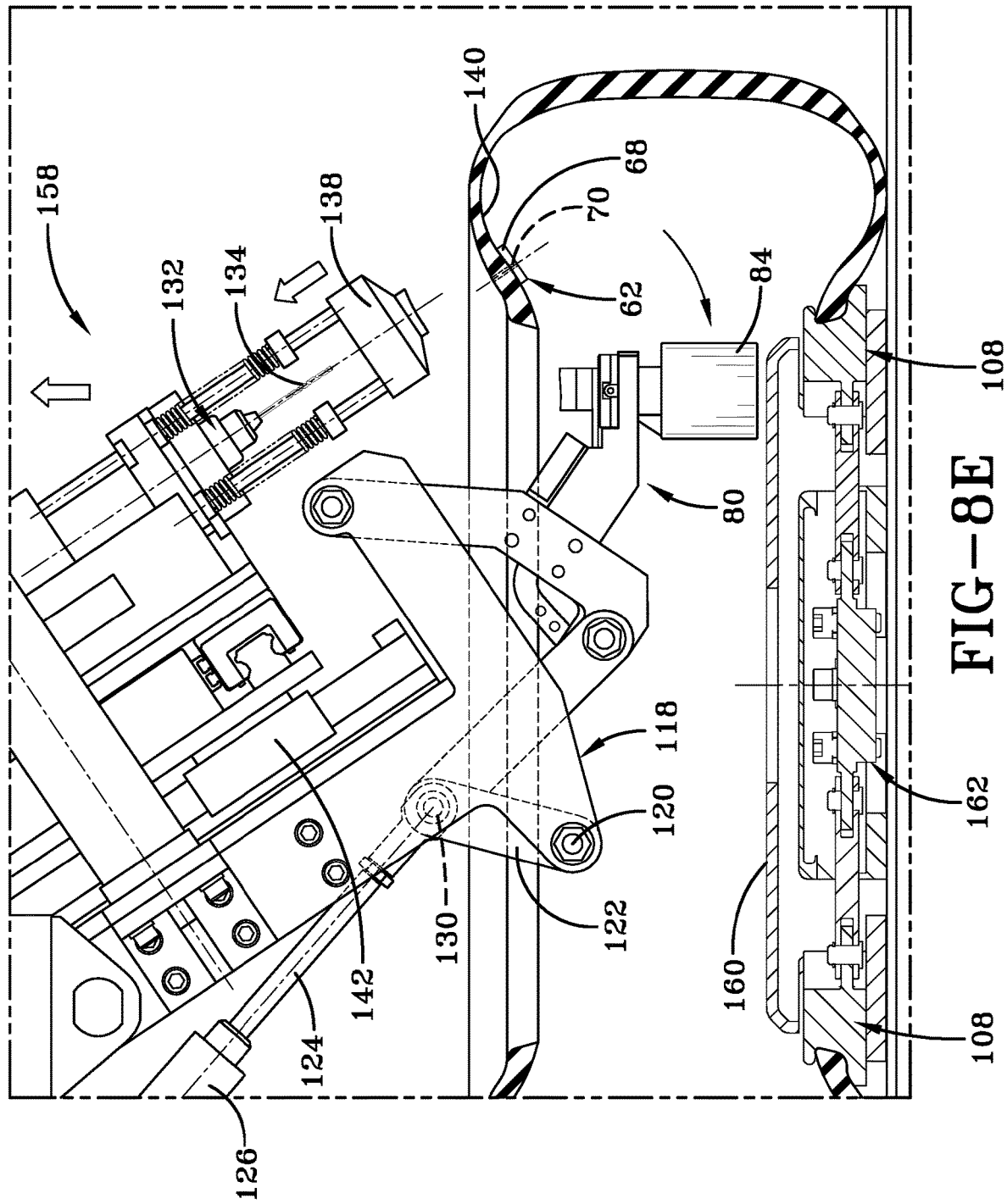

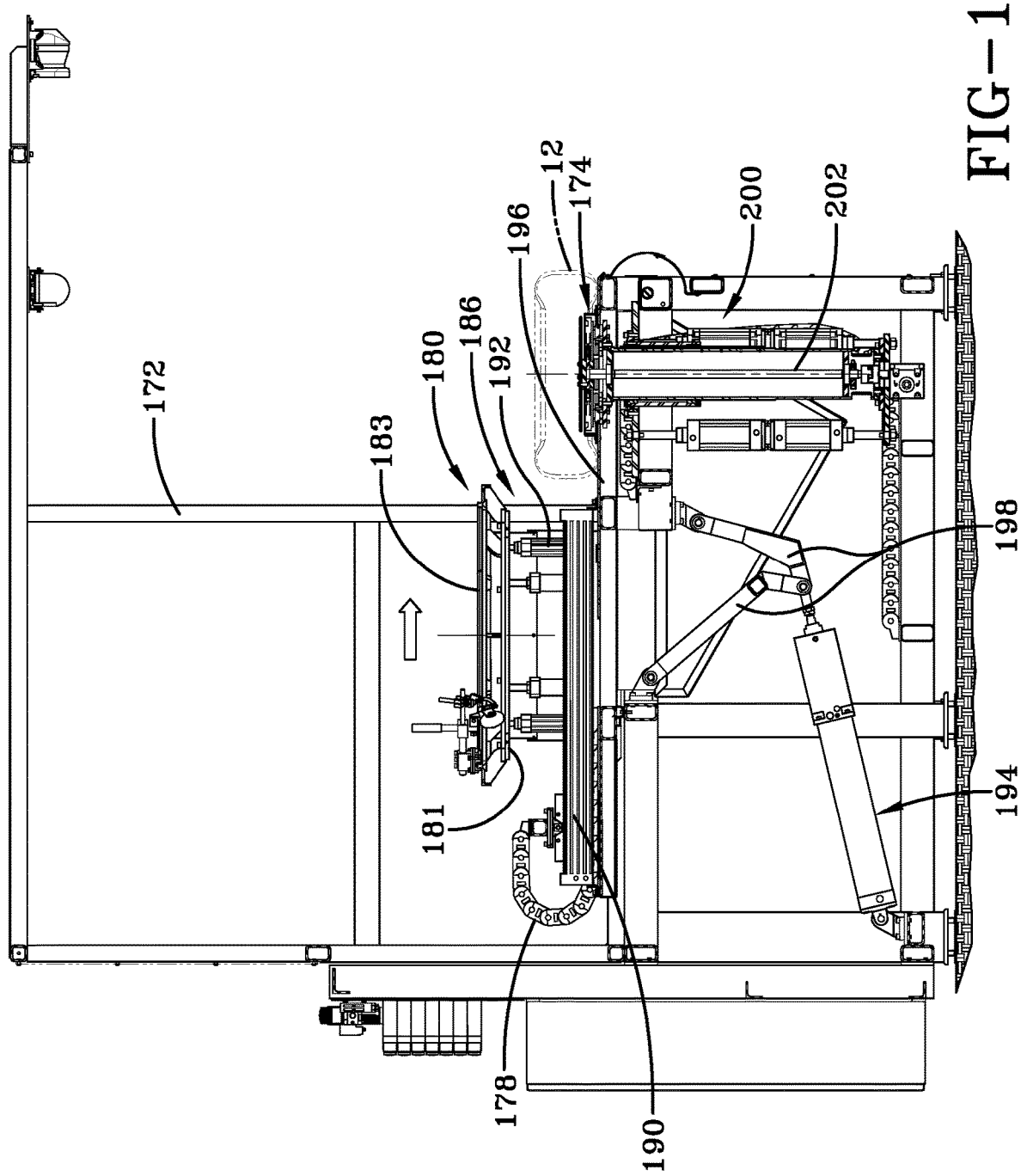

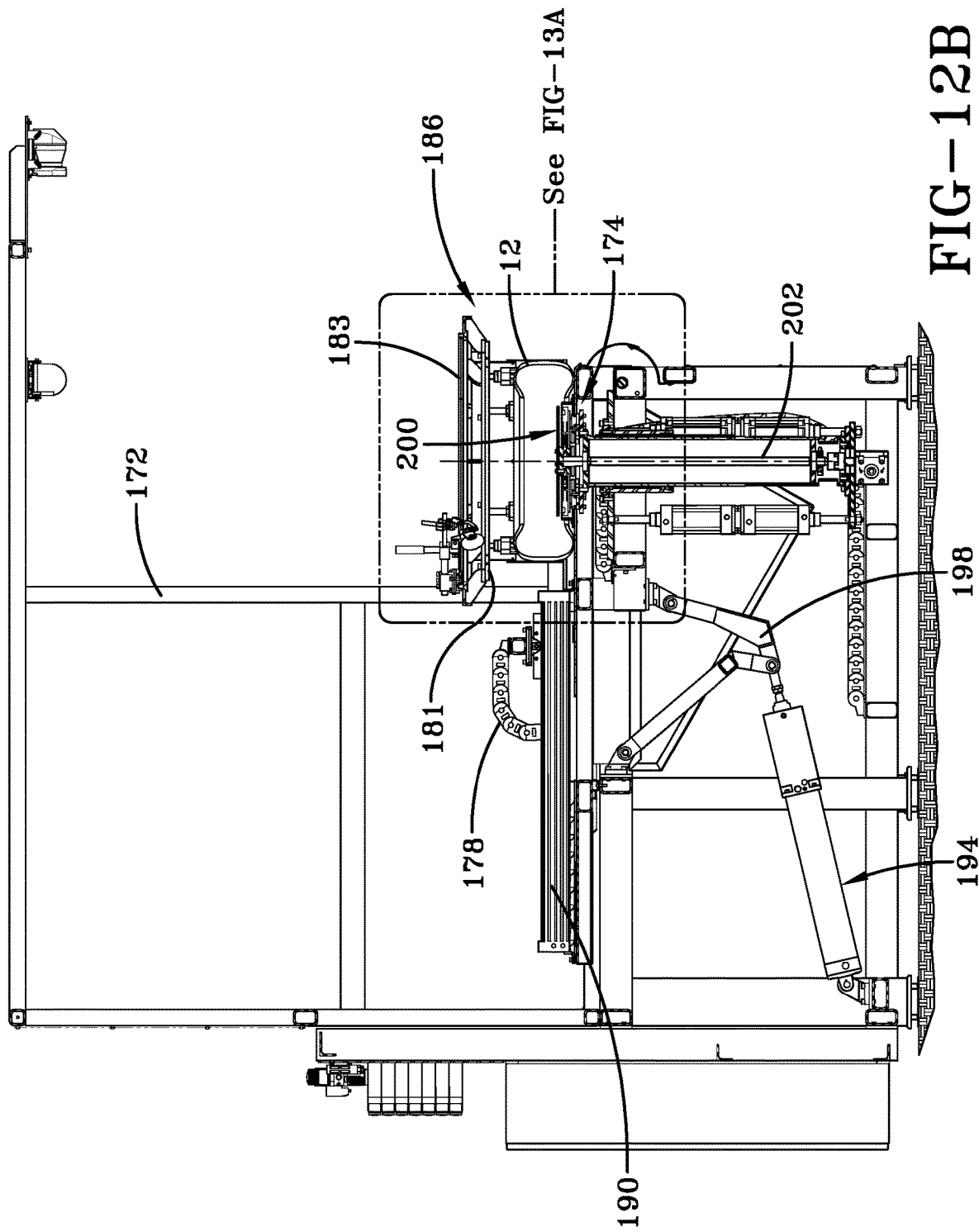

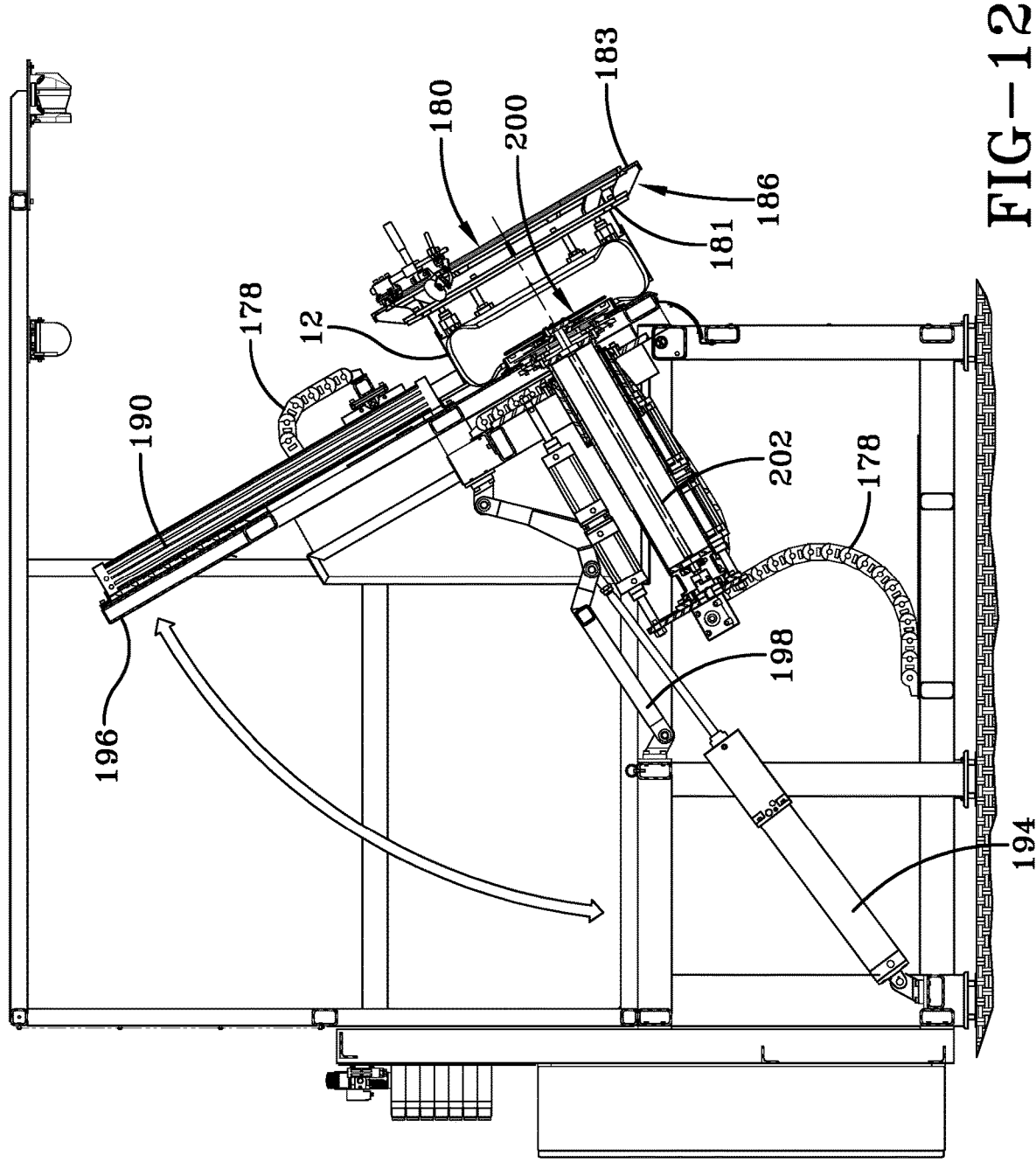

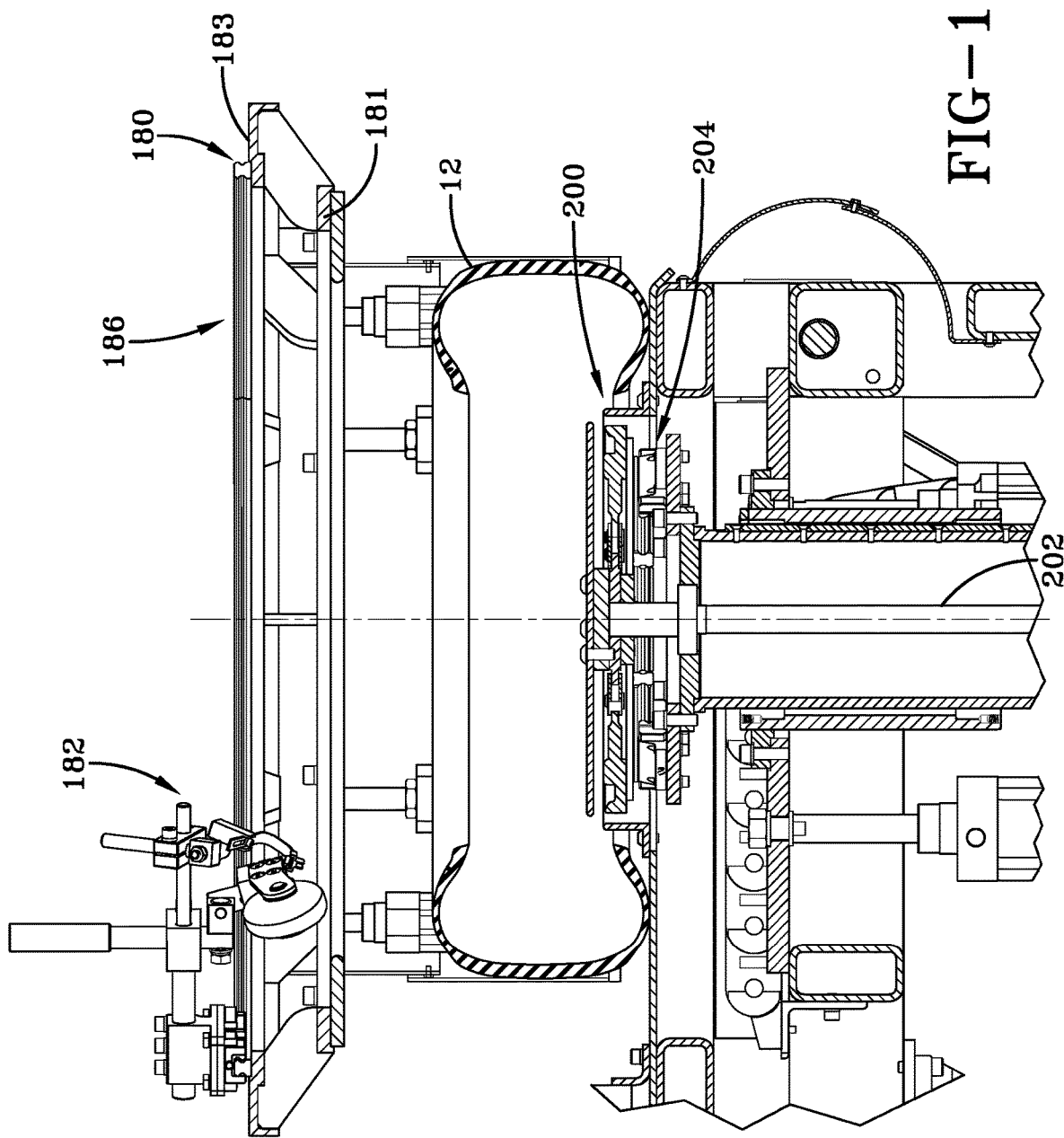

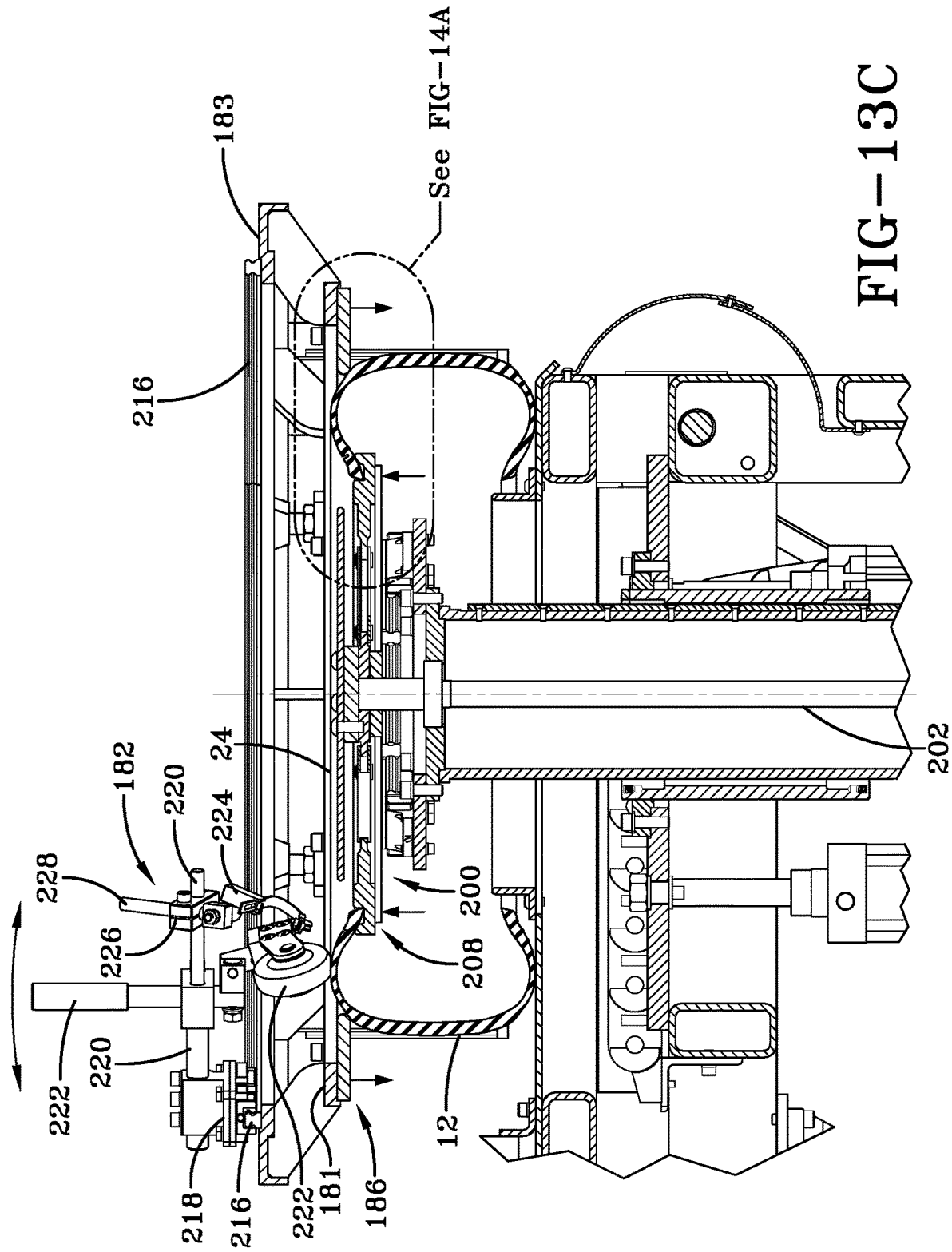

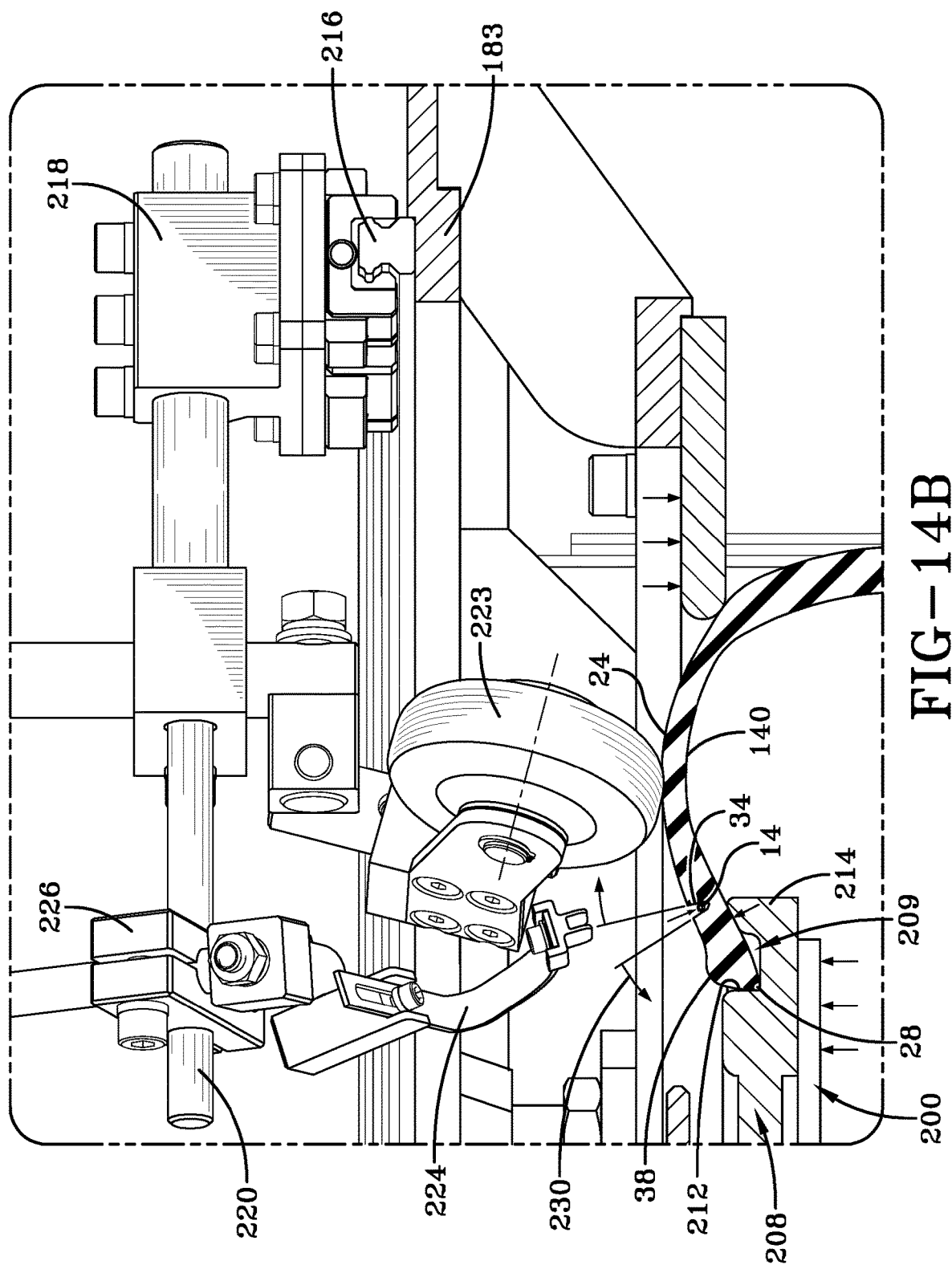

US 10,717,247 B2

APPARATUS AND METHOD FOR MANUFACTURING AN AIR MAINTENANCE TIRE

UNITED STATES GOVERNMENT FUNDING

This invention was made with government support under contract number DE-EE0005447 awarded by the Department of Energy. The government has certain rights in the invention.

FIELD OF THE INVENTION

The invention relates generally to air maintenance systems for a tire and, more specifically, to apparatus and a method for manufacturing an air maintenance tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will maintain a desired level of air pressure within the tire and compensate for any reduction in tire pressure over time without the need for driver intervention.

It is further desirable to manufacture an air maintenance tire in a cost effective and efficient manner. Apparatus and a method of manufacturing an air maintenance tire accomplishing cost effectiveness and efficiency objectives is therefore an ancillary and important need to be achieved.

SUMMARY OF THE INVENTION

In one aspect of the invention, manufacturing apparatus and assembly method for assembling an air maintenance is provided. An air pumping tube assembly station constructs an air pumping tube sub-assembly, the air pumping tube sub-assembly including an elongate air pumping tube; one or more components of an air inlet device; and one or more components of an air outlet device. A cured tire is formed having an elongate groove configured to accept the air pumping tube sub-assembly with enlarged groove inlet and outlet regions of the elongate groove to respectively accept the inlet device component(s) and the outlet device component(s) of the air pumping tube sub-assembly. Within a pumping tube sub-assembly installation station, the pumping tube sub-assembly is inserted segment-by-segment into the elongate groove with the inlet device component(s) and the outlet device component(s) registered into the enlarged inlet and the enlarged outlet regions of the elongate groove.

In another aspect, the tire is routed through a pressure regulator installation station for installing a pressure regulator to an outlet device component configured as a docking station. The docking station includes a block body mounting against a tire surface opposite the outlet region of the elongate groove. The pressure regulator attaches to the block body.

According to a further aspect of the invention, groove-spreading apparatus is provided operative to enlarge an opening into the elongate groove whereby facilitating insertion of the air pumping tube. The groove-spreading apparatus includes a moveable chuck operatively engaging and receiving a tire tie within a chuck channel. The groove-spreading apparatus further includes a tire-depression device for pushing against a high flex region of the sidewall proximate and above the elongate groove.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" as referred to in a tire tread means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved. "Groove" as referred to in a tire sidewall is explained in the Detailed Description of the Invention below.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 5B is a side view of the station showing the head assembly moved into tire location, scanning for the tire passage pocket.

FIG. 8E is a view showing the drill head and docking holder retracted from tire sidewall.

FIG. 12A is a section view taken from FIG. 10 showing the upper assembly in a retracted position, tire loaded.

FIG. 12B is a section view showing the upper assembly moved into place at the tire axis.

FIG. 12C is a section view showing the tire-supporting table in its tilted location.

FIG. 13A is an enlarged section view showing the upper assembly in location over the tire, the tire centered on conical post with lower assembly retracted.

FIG. 13C is a section view showing the upper assembly pushing downward on the tire sidewall as the lower assembly pushes upward against bead area.

FIG. 14B is a view showing the stitching/applicator device.

DETAILED DESCRIPTION OF THE INVENTION

Figure 1:
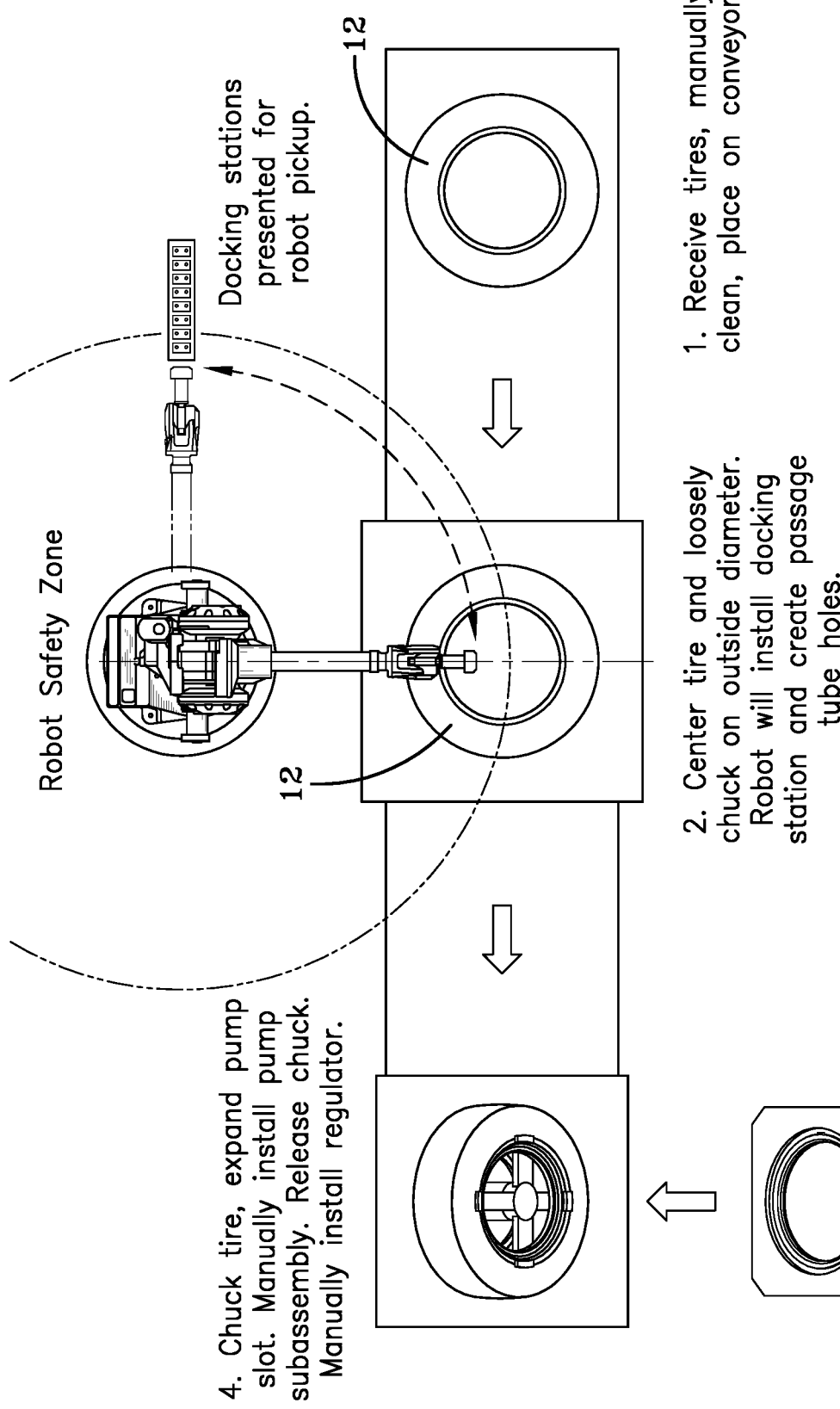
FIG. 1 is a process flow diagram for an Air Maintenance Tire.
Figure 16:
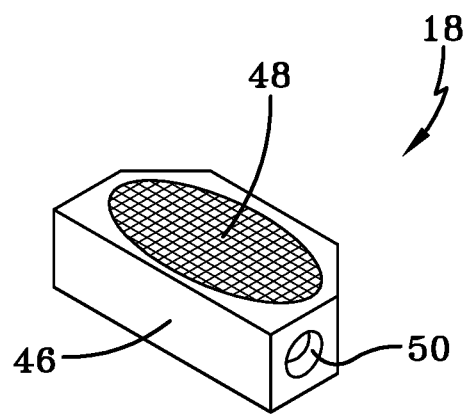
FIG. 16 is a view of the inlet filter.
Figure 17:
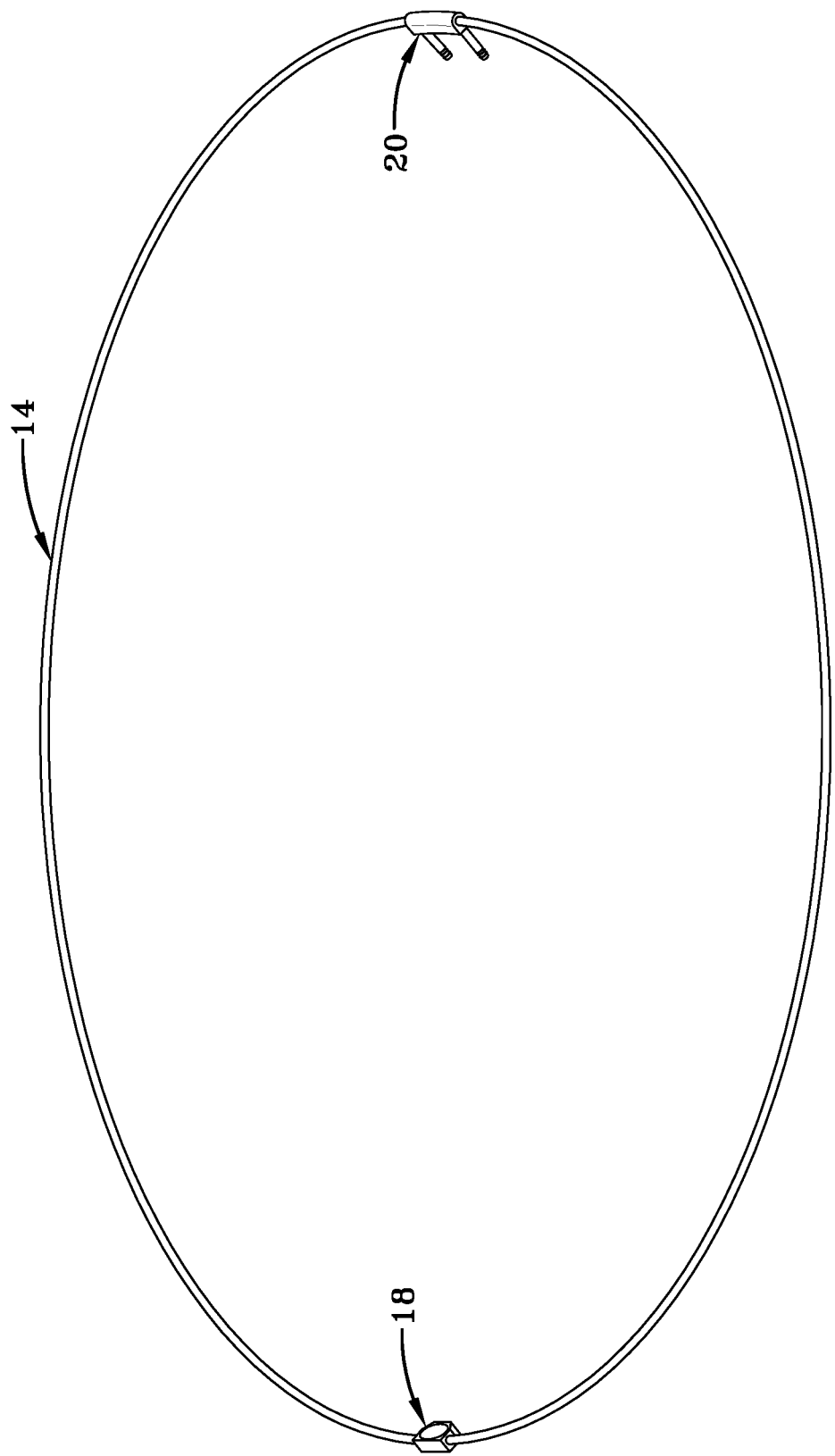
FIG. 17 is a view of the tube, inlet filter and outlet connector assembled.

Referring to FIGS. 1, 16 and 17, a process flow diagram 10 is shown in FIG. 1 for an "Air Maintenance Tire". As used herein, an Air Maintenance Tire (or "AMT") is a tire that includes a pressurized air source for maintaining the air pressure within a tire cavity at a preferred level. The AMT 12 is of a type including an air pumping tube 14 having an internal air passageway 16, an inlet device 18 for admitting outside air into the air pumping tube and an outlet device 20 for directing pressurized air from the pumping tube passageway 16 into a cavity of the tire 12. The general operation of a peristaltic pump for use in a tire is described in U.S. Pat. Nos. 8,113,254 and 8,042,586 which were both filed on Dec. 12, 2009, and issued on Feb. 14, 2012 and Oct. 25, 2011, respectively, and are incorporated herein in their entirety by reference. The tire 12 is of conventional construction, having a tread region 22, a pair of sidewalls 24, 26 extending from opposite bead areas 28, 30 to the tire read region 22 (see FIGS. 5A and 8A). The tire encloses a tire cavity 32.

Figure 14A:
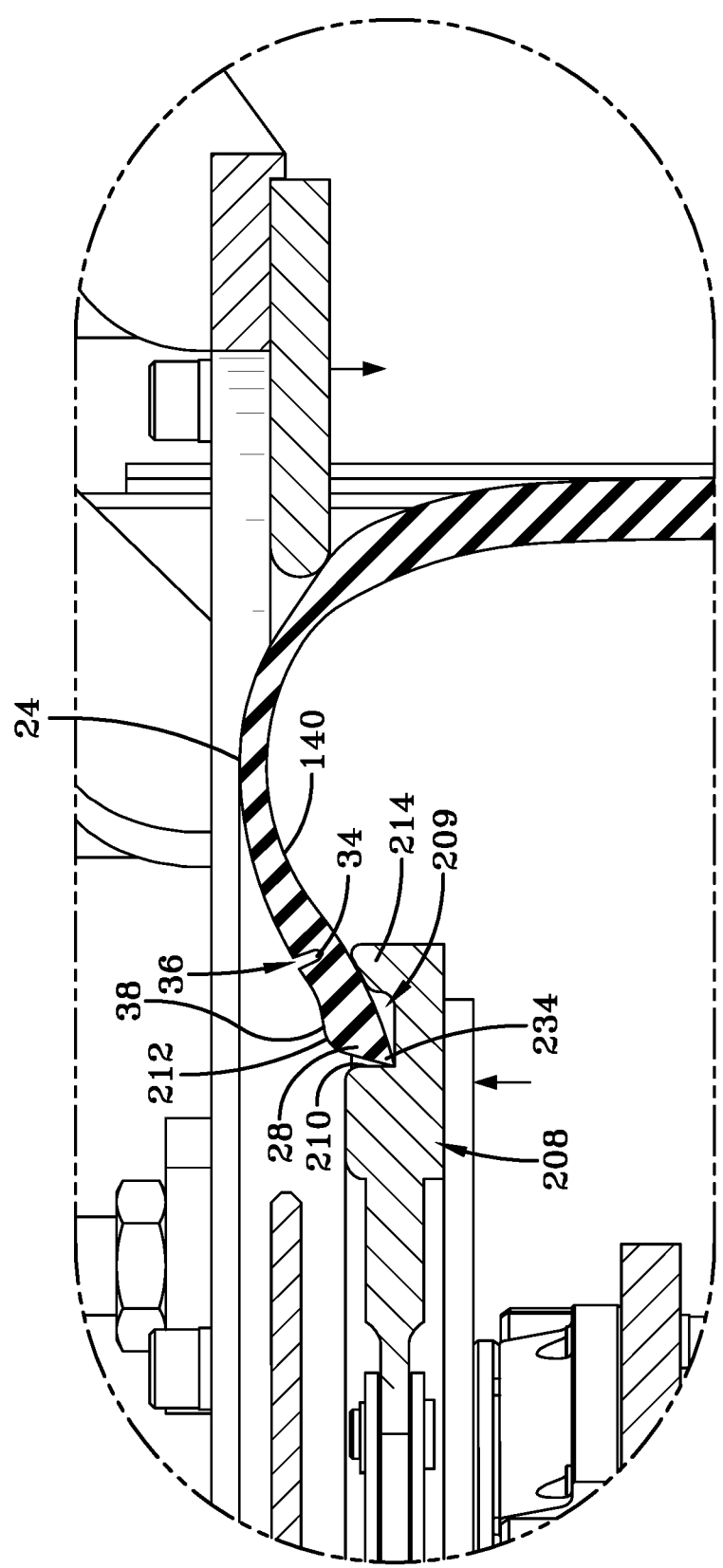
FIG. 14A is an enlarged view taken from FIG. 13C showing the tube channel opened.

The tire 12 is further constructed having an elongate, generally annular groove 34 positioned within a lower flexible region of one or both of the sidewalls 24, 26 as shown in FIG. 14A. The groove 34 is profiled in section to accommodate receipt of the tube 14 through an outwardly accessible groove opening 36. The lower flexible regions of the sidewalls 24, 26 are located proximate to and radially outward from projecting chafer protrusions 38, 40. The chafer protrusions 38, 40 project outward from the sidewall and conventionally provide a reinforcement from rim damage to the tire. The bead areas 28, 30 of the tire sidewalls 24, 26 extend to a terminally located toes 42, 44, respectively. The sidewall (or each sidewall) groove 34 is positioned at a location proximate and radially outward the chafer of the sidewall 24. The region provides an adequate flexing required to operationally close and open the AMT tube 14 as the tire rotates.

The air maintenance assembly elongate air tube 14 encloses the air passageway 16 that is generally elliptical in cross-section. The tube 14 is formed of a resilient, elastomeric flexible material such as plastic or rubber compounds and composites that are capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purpose of maintaining air pressure within the cavity 32. The tube 14 preferably follows an annular 360° path and is formed by two 180 degree tube segments.

The AMT assembly inlet device 18 of FIGS. 16 and 17 includes a housing 46 in which an air filter component 48 is situated. Outside air is drawn into the housing 46 and passes through the filter 48 to the air passageway 16 of the pump tube 14. Access openings 50 (one being shown) at opposite sides of the housing 46 receive tube ends to securely connect the housing to the pump tube 14.

Figure 15:
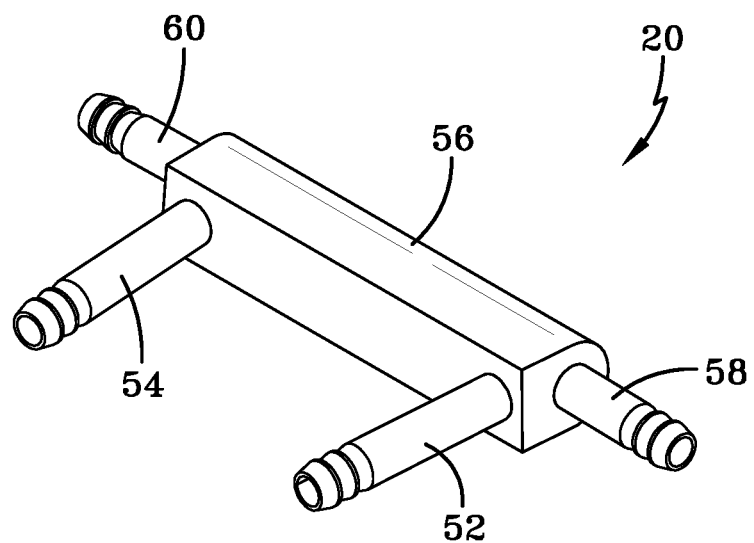
FIG. 15 is a view of the outlet connector that is inserted into tube passage pocket.

The outlet device 20 is spaced approximately 180° opposite the inlet device 18. As seen in FIGS. 15 and 17, the outlet device 20 has a T-shaped configuration in which T-forming sleeves 52, 54 connect to main elongate housing 56. Protruding connector sleeves 58, 60 extend from the ends of the housing 56 and connect into ends of the tube 14. The assembly of FIG. 17 is intended to reside within the groove 34 of the tire by means of a post-cure assembly procedure described herein. The air outlet sleeves 52, 54 of the outlet device 20 are intended to protrude through formed tubular passageways from the housing 56 to a regulator docking station assembly 62 mounted to an inner liner surface of the tire defining tire cavity 32.

Figure 6A:
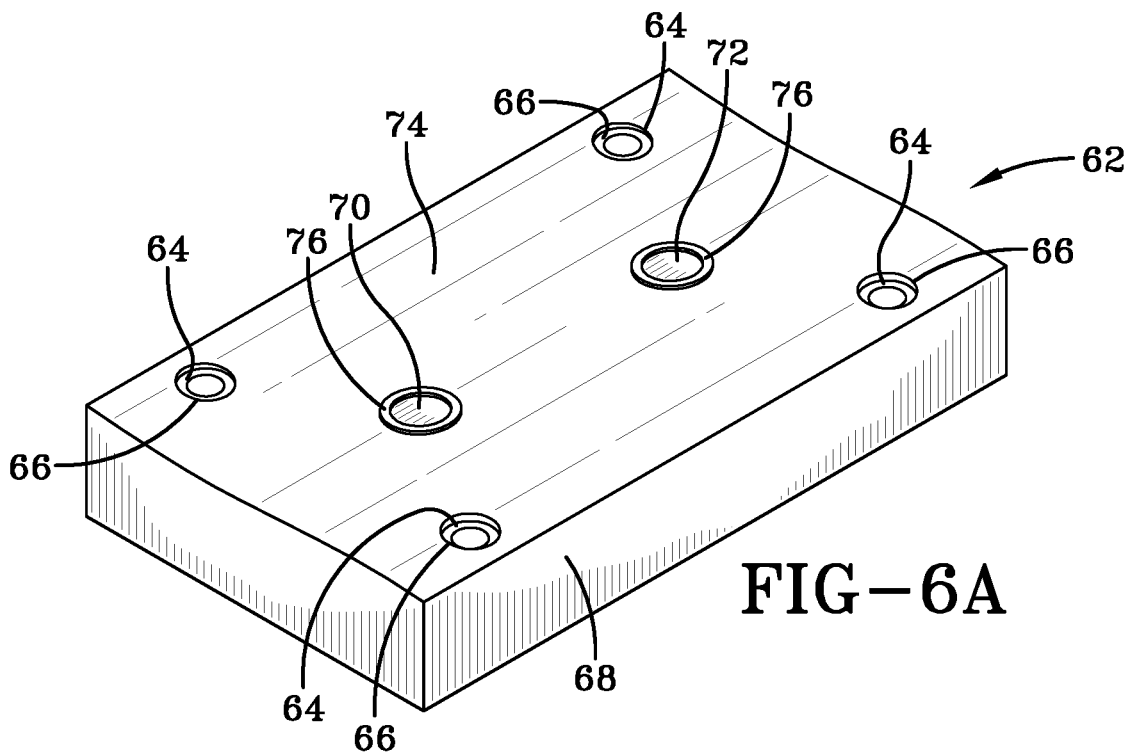
FIG. 6A is a top perspective view of the docking station showing threaded inserts assembled.

FIG. 6A is a top perspective view of the docking station assembly 62 showing four cylindrical, externally threaded and internally smooth, inserts 64 assembled into sockets 66 positioned at corners of a rectangular docking station block 68. Centrally disposed and extending through the block 68 are tubular passageways 70, 72 dimensioned to closely receive the tubular outlet sleeves 52, 54 of the outlet device 20. The tubular passageways 70, 72 are not as yet formed in the views of FIGS. 6A and 6B; the drilling or forming of such passageways occurring during the AMT assembly described following. Block 68 is formed in a solid state of suitable material such as a commercially available plastics composition. Rectangular in general configuration, the block 68 has a concave upper surface 74 adaptively contoured to fit snugly against the inner liner of a tire defining a tire cavity. The upper surface 74 of the block 68 is coated with adhesive to secure the block to the target tire inner liner location. The tubular passageways 70, 72 are each ringed by a raised circular ridge 76 to prevent the adhesive from migrating into the passageway 70, 72 prior to formation of the passageways during assembly.

Figure 6B:
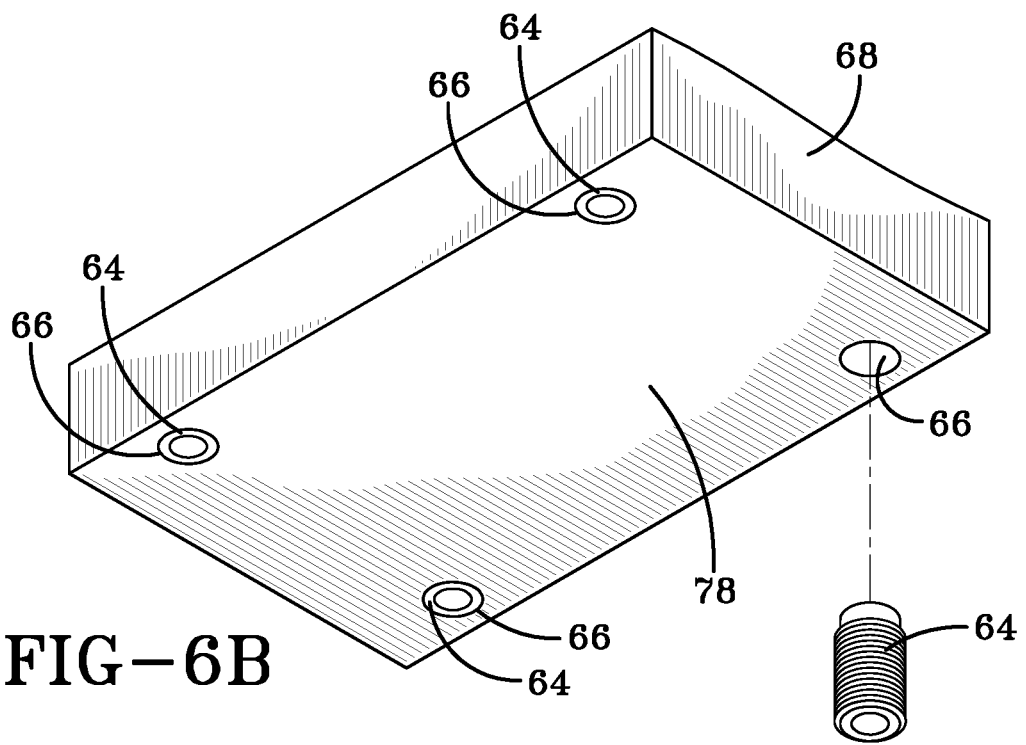
FIG. 6B is a bottom perspective view of the docking station showing the threaded insert exploded out.

FIG. 6B is a bottom perspective view of the docking station showing one of the threaded inserts 64 exploded out. The outward, or bottom surface 78 of the block 68 represents a mounting surface to which a pressure regulator (not shown) of a type commercially available attaches. The regulator operates to monitor pressure within the tire cavity 32 and open and close air flow from the pump tube 14 into the cavity when cavity air pressure is measured to be below or above a desired threshold. The regulator is coupled to the sleeves 52, 54 that extend from outlet device 20 through the tire sidewall 24. So connected, the regulator is in position to block or open pressurized air flow from the sleeves 52, 54 into the tire cavity 32. Adhesive is pre-applied to surface 78 prior to positioning at the tire sidewall 24. The passageways 70, 72 are created after the block 62 is assembled to the tire so that the passageways 70, 72 can be precisely aligned with the sleeves of the outlet connector. The raised rings 76 surrounding each passageway 70, 72 prevent adhesive from coming into contact with the drills forming the passageways. The block 62 may be formed from any suitable rigid material such as plastic.

Figure 7A:
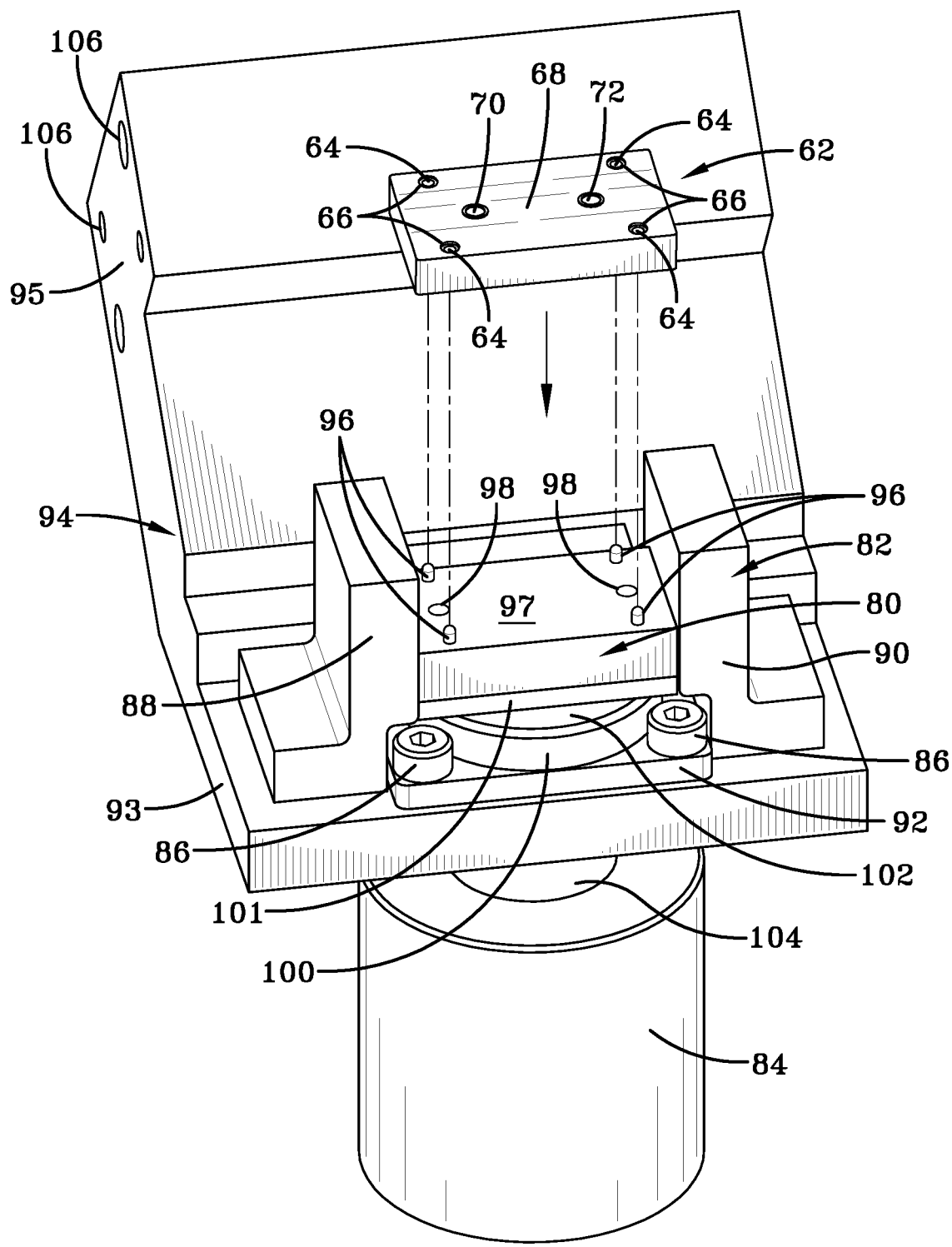
FIG. 7A is an enlarged view of the end of robot arm holding assembly showing the docking station block being inserted.
Figure 7B:
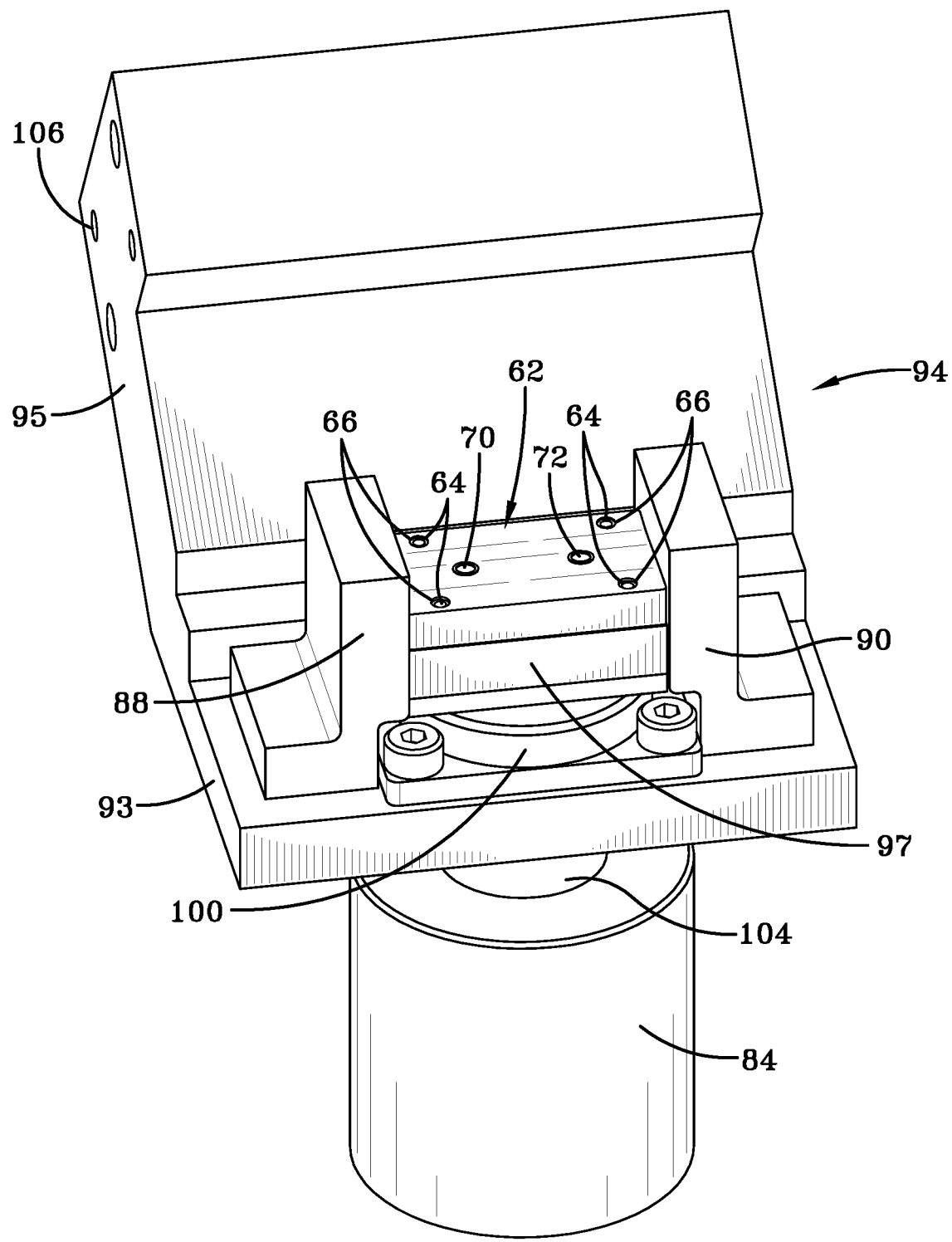
FIG. 7B is a view of the holding assembly with the docking station block in place.
Figure 7C:
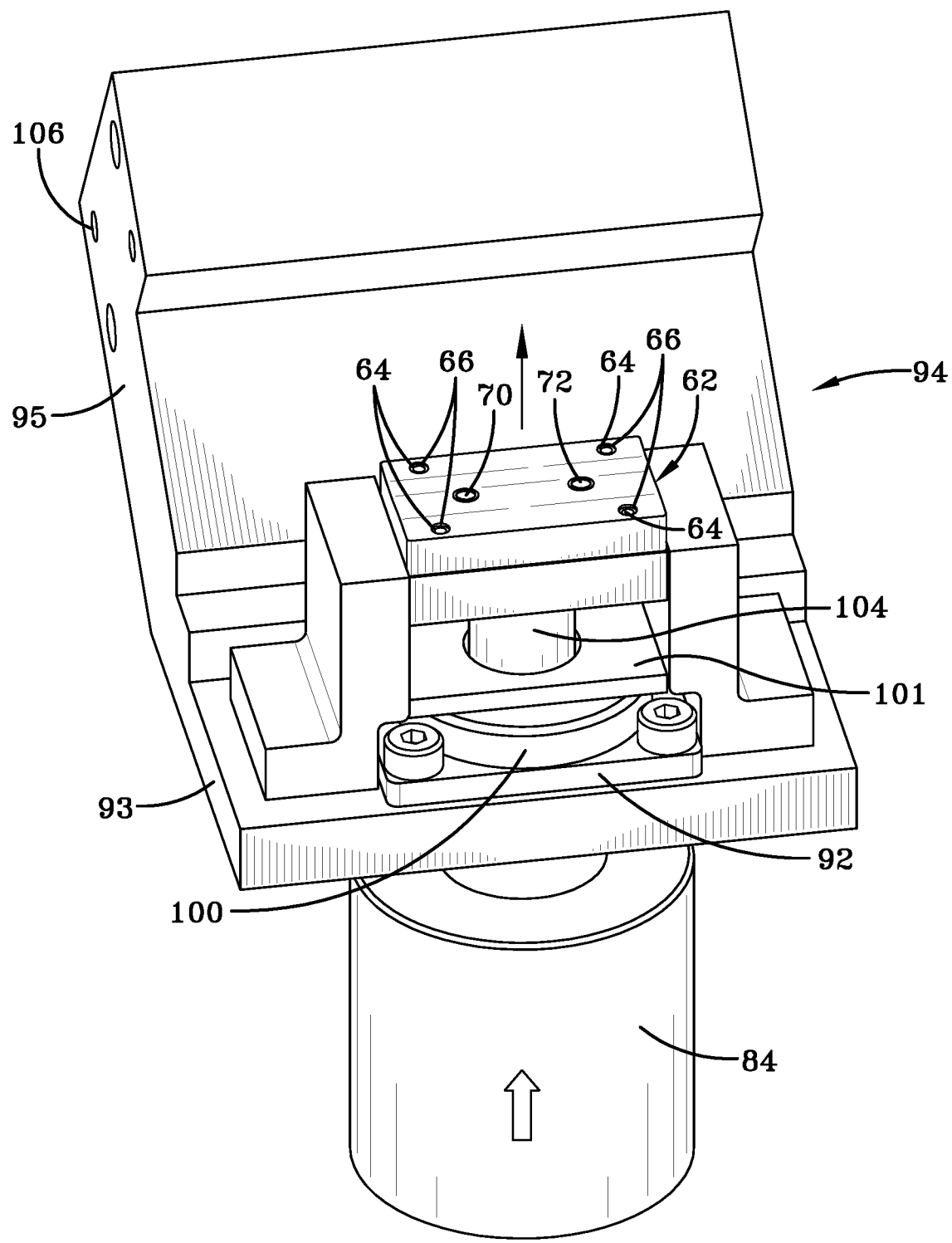
FIG. 7C is a view of the holding assembly showing lifting of docking device block into mounting position location.

Referring to FIGS. 7A through 7C, end-of-robotic-arm applicator assembly 80 used in the drilling the passageways 70, 72 is shown. A registration fixture 82 is positioned for supportive receipt of the docking station block 62. Spaced apart L-shaped guide blocks 88, 90 form a pocket therebetween for guiding the docking station block 62 into proper seated location onto a support block 97. The block 97 mounts to a support plate 101 having a central through hole 103. The plate 101 is mounted to a supportive collar 100. The collar 100 has a central through opening 102 aligned with the hole 103 of plate 101 through which a piston 104 reciprocally moves upward and downward. The piston 102 is secured within a piston housing 84.

The guide blocks 88, 90 mount to a generally L-shaped mounting bracket 94 angled and formed by a lower bracket arm 93 intersecting with an upper bracket arm 95. The collar 100 mounts to a plate 92 that is secured to an upper surface of the lower bracket arm 93 by screws 86. The support block 97 is positioned between the guide blocks 88, 90. Projecting upwardly from the block 97 at the four corners are four pins 96 to receive the docking station block sockets 66 and thereby locate the threaded inserts 64 into correct position. The support block 97 has two vacuum ports 98 at opposite sides to hold the docking station block 68 in place. The opening 102 provides clearance for the drilling of the passageways 70, 72 and vacuum takeaway of debris. As shown, the upper arm 95 of the mounting bracket 94 is provided with mounting sockets 106 positioned to attach to a robotic arm (not shown).

FIG. 7B shows a view of the holding assembly 80 with the docking station block 62 in place. FIG. 7C is a view of the holding assembly 80 showing lifting of the docking device block by the piston arm 104 into mounting position location against a tire inner liner wall (not shown). The adhesive applied to the outward surface of the docking station block 62 will adhere to the tire inner liner and thereby securely affix the docking station block to the tire.

Figure 8A:
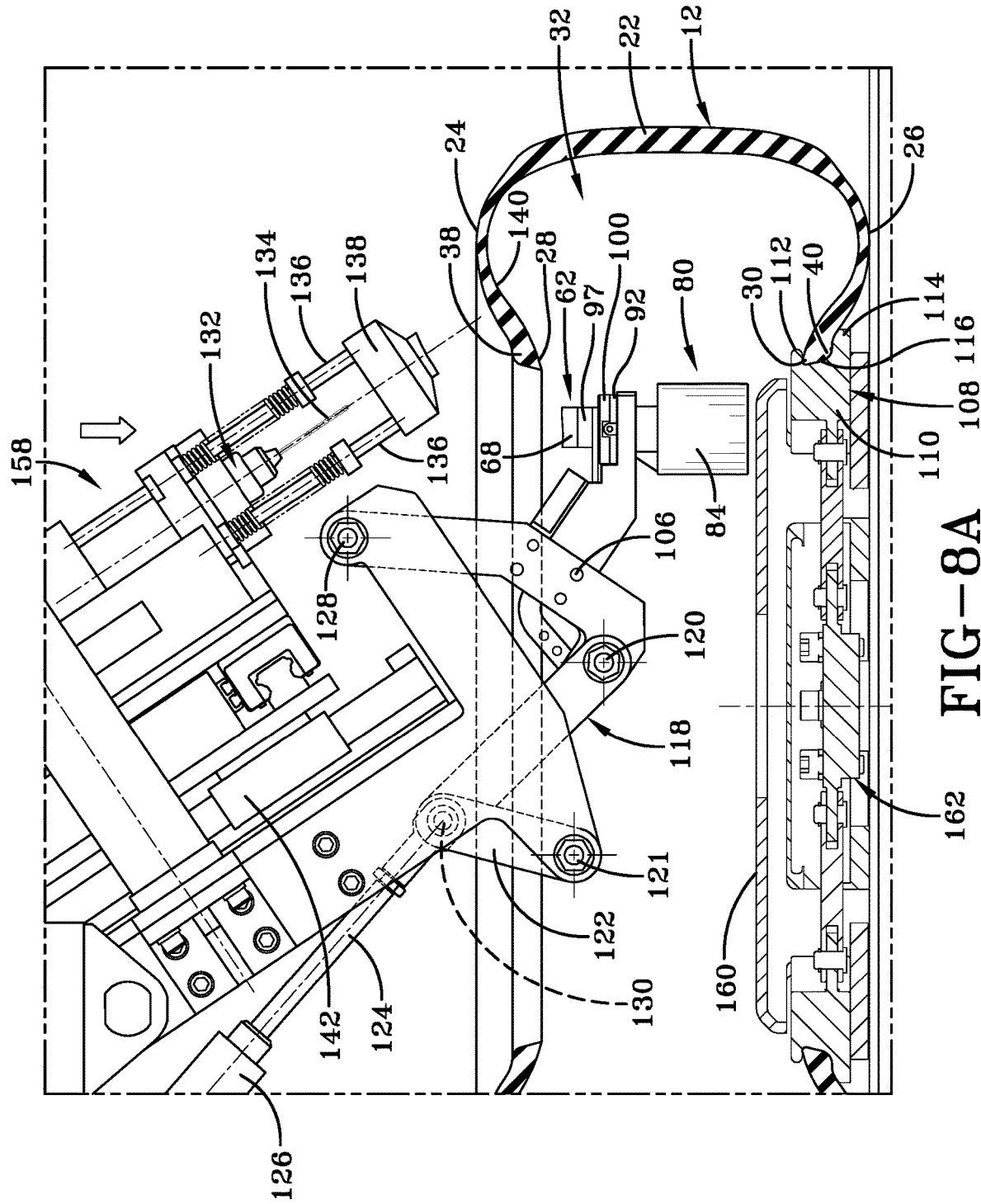
FIG. 8A is a view showing the docking station in the applicator and the lower bead area chucked.

FIGS. 8A through 8E are sequential views showing the procedure for drilling of the passageways 70, 72 through the docking station block 68. FIG. 8A is a view showing the docking station block 68 in the end-of-robotic-arm applicator assembly 80 and the lower bead area 28 of the tire chucked into a fixed position by a chuck 108. The chuck 108 includes a reciprocally moving elongate chuck block 110 having upper and lower clamping fingers 112, 114 at a forward end defining therebetween a bead receiving recess 116. The upper clamping finger 112 attaches over the remote toe of the bead area 28 and the lower clamping finger 114 clamps over the chafer projection 38. So clamped, the tire is held in a fixed position for the drilling procedure.

The applicator assembly 80 is carried by a robotic arm assembly 118 having a vision system in order to locate and engage, attaching by means of the mounting sockets 106 and bolt hardware 120. The arm assembly 118 includes a pivot arm linkage 122 coupled to the remote end of a piston arm 124 extending from a hydraulic piston cylinder 126. Pivot linkage pins 128, 130 connect linkage 122 to raise and lower the end-of-arm applicator assembly 80 inside of the tire 12 during attachment of the docking station block 62 to the tire inner liner wall 140. A drill head 132 is mounted adjacent to the linkage 122 and positioned to address an outer surface of the tire 12 proximate the bead area 128. The drill head 132 includes a pair of drill bits 134 that slide inward and outward along a pair of guide rails 136 toward and away from the target region of tire 12. A register block 138 is located at the terminal ends of the guide rails 136 and functions to locate and engage within a passage pocket formed within the tube 34 at a location where a regulator component attaches. Actuation cylinder 142 is coupled to raise and lower the drill head 132 toward and away from the target drill region on tire sidewall 24. Throughout the process of drilling through holes through the sidewall 24 of tire 12 and passageways 70, 72 through the docking station block 68, the tire is chucked by chuck block 110. The recess 116 between the chuck clamping protrusions 112, 114 capture the bead area 28 of the tire and thereby stabilizes the tire into position for the drilling operation.

Figure 8B:
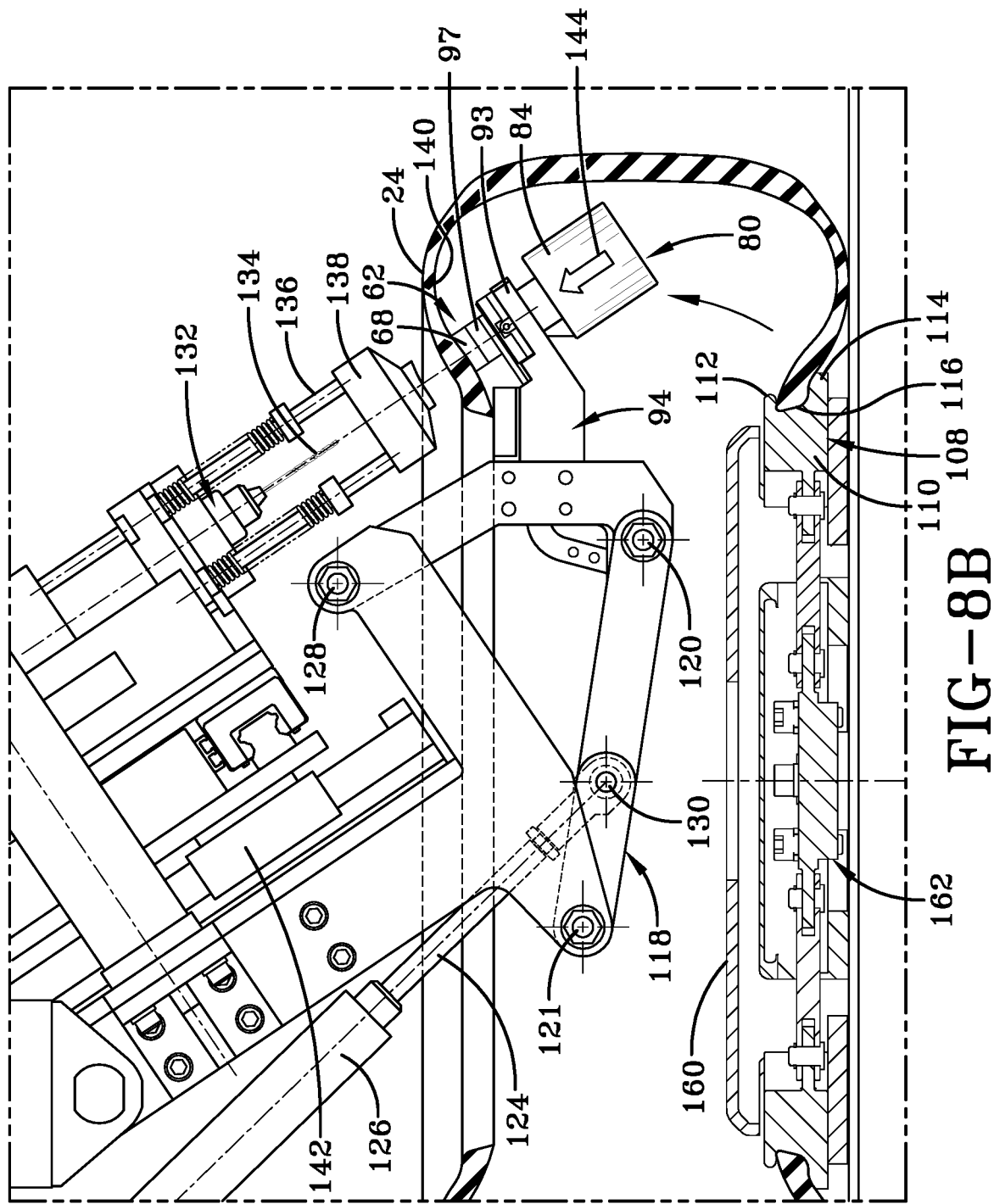
FIG. 8B is a view showing the docking station applied to the inner tire wall.

FIG. 8B is a view showing the docking station block 68 applied to the inner tire liner wall 140. The docking station block 68 has been preloaded into the assembly 80 as shown in FIGS. 7A through 7C and an adhesive applied to the outer surface of the block 68. The docking station block is held by vacuum, with the adhesive applied off line. The linkage 118 moves the end-of-arm applicator assembly 80 into the tire cavity and, upon extension of the piston 124, pivots the assembly 80 upward into proximity with the wall 140. Actuation of the piston 104 from housing 84, as shown by directional arrow 144, moves the docking station block 68 into position against the wall 140 of the tire 12. The drill head 132 is, at this stage, in the retracted position. Pre-applied adhesive to the docking station block 68 operates to adhere the block 68 to the tire inner liner 140.

Figure 8C:
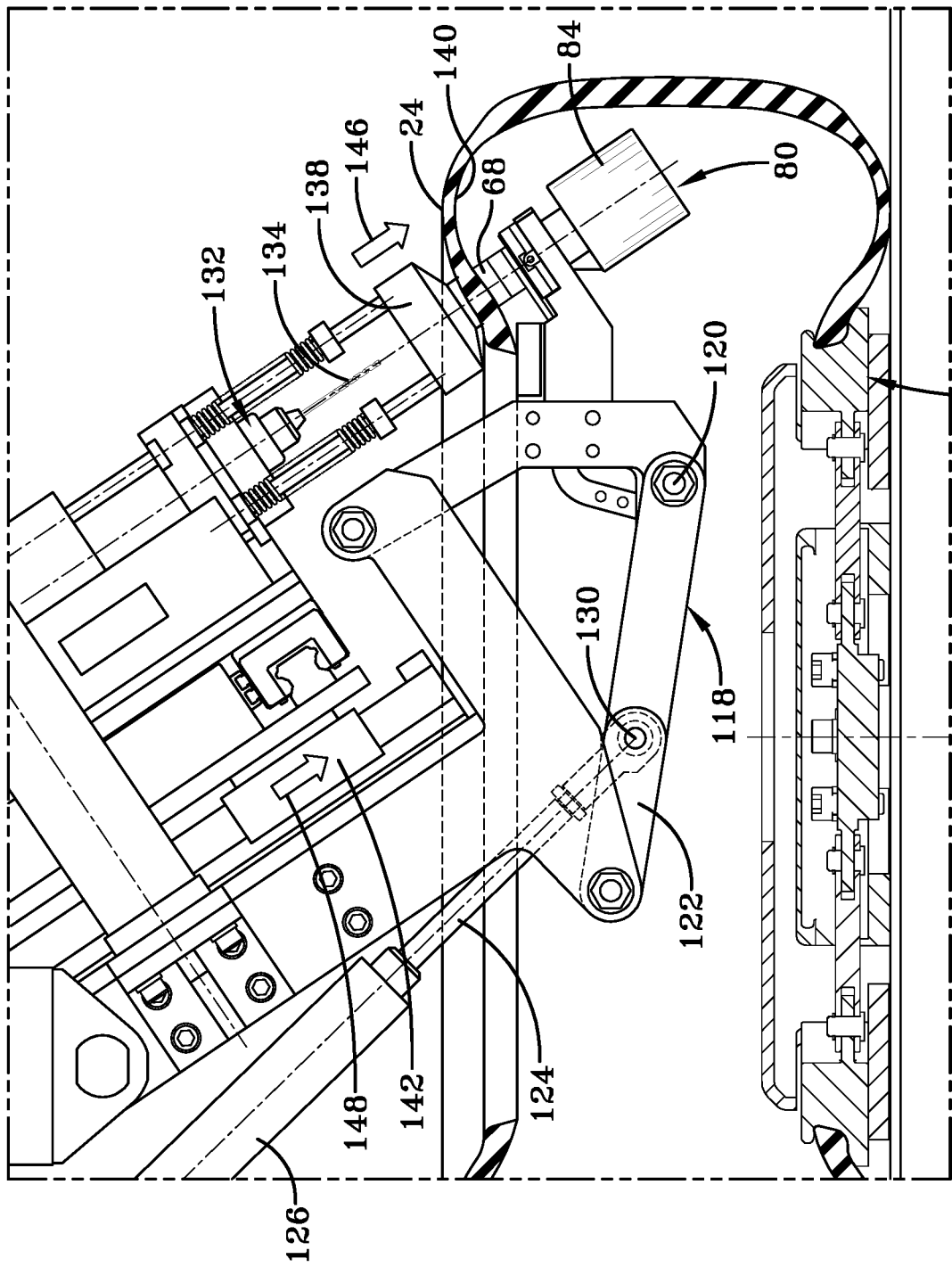
FIG. 8C is a view showing the drill head extended to the contact sidewall.
Figure 8D:
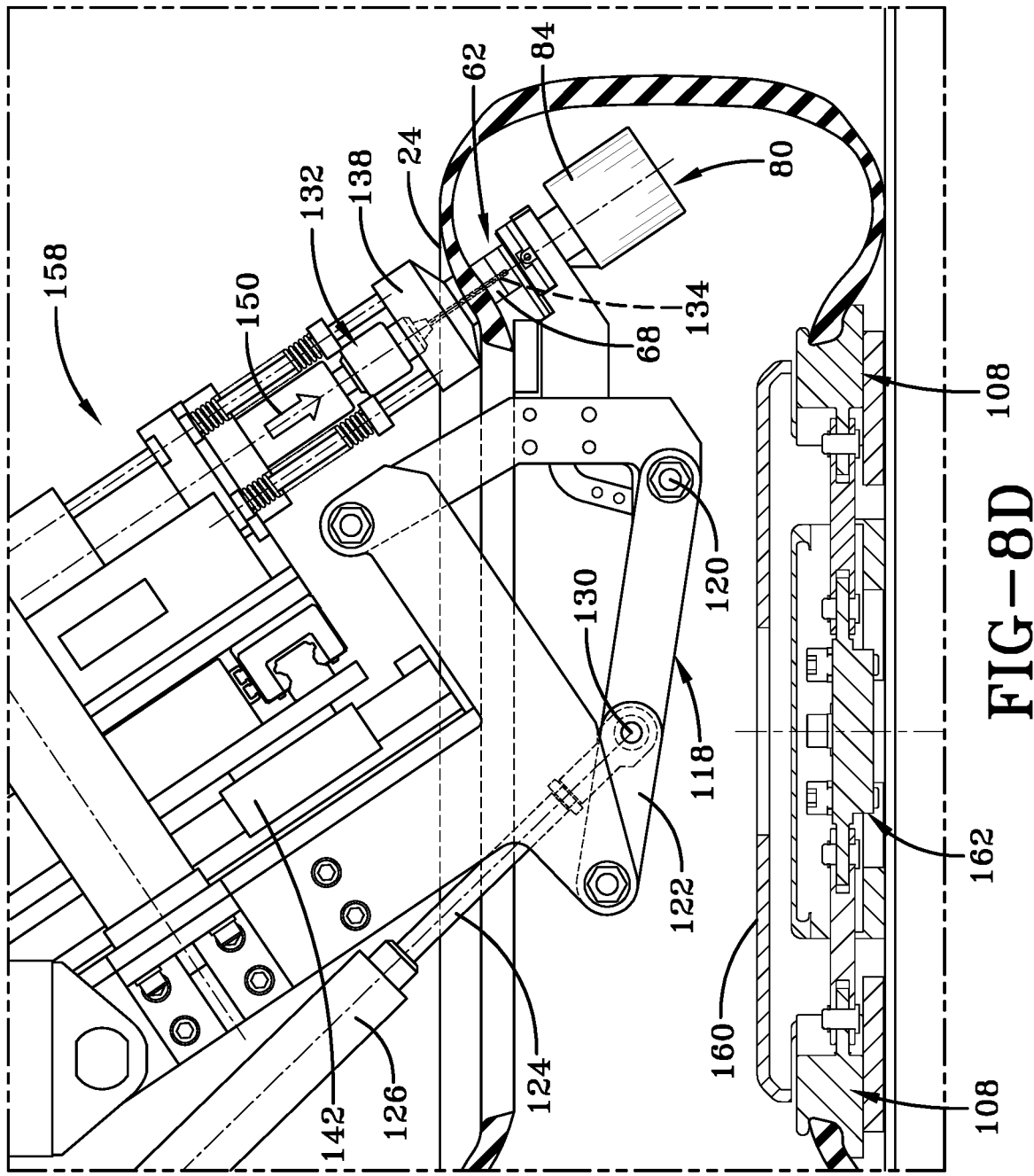
FIG. 8D is a view showing the drill bit extended and the passage hole created.

FIG. 8C is a view showing the drill head 132 extended as indicated by directional arrow 146 to contact the tire sidewall 24 with the register block 138. The tire sidewall 24 has an annular groove 34 formed therein, the groove 34 having enlarged pockets formed for the inlet and outlet devices The robotic system employed will have a vision system in order to locate and engage the register block 138 with an outlet pocket of the groove. Movement of the drill head 132 is actuated by operation of the cylinder 142 in the direction of directional arrow 148. FIG. 8D is a view showing the drill bits 134 extended through the positioning collar 138 and drilling through the tire sidewall 24 to simultaneously create passageways 70 and 72 through docking station block 68. A vacuum takeaway system is employed to remove debris from the drilling procedure. The pivot arm linkage 118 applies the docking station 62 to the tire and holds it in place for the time required to create passageways 70, 72. FIG. 8E is a view showing the drill head 132 and end-of-arm applicator assembly 80 retracted from the tire cavity as shown by directional arrows.

With reference to FIG. 14A and FIGS. 1 through 5B, FIG. 1 represents is a process flow diagram for the air maintenance tire 12 pursuant to the subject invention. The process is represented by Stations 1 through 4. In Station 1, the cured tire 12 is received, manually cleaned and placed on a conveyor. The cured tire 12 has created within one or both sidewalls the annular groove 34. In Station 2, the tire 12 is centered and loosely chucked on an outside diameter. A robotic arm installs the docking station and creates the passage tube holes 70, 72 as described previously herein above. The tire 12 proceeds from Station 2 to Station 4 as a Station 3 builds a pump subassembly customized in size for the designated tire 12. The pump subassembly consists of the pump tube 14, the inlet device 18, and the outlet device 20 assembled into an annular form.

In Station 4, the tire 12 is chucked, and the tube-receiving groove 34 expanded. The tube assembly is manually installed. The tire chuck is then released and a regulator is installed to the previously installed docking station block 68.

Figure 2:
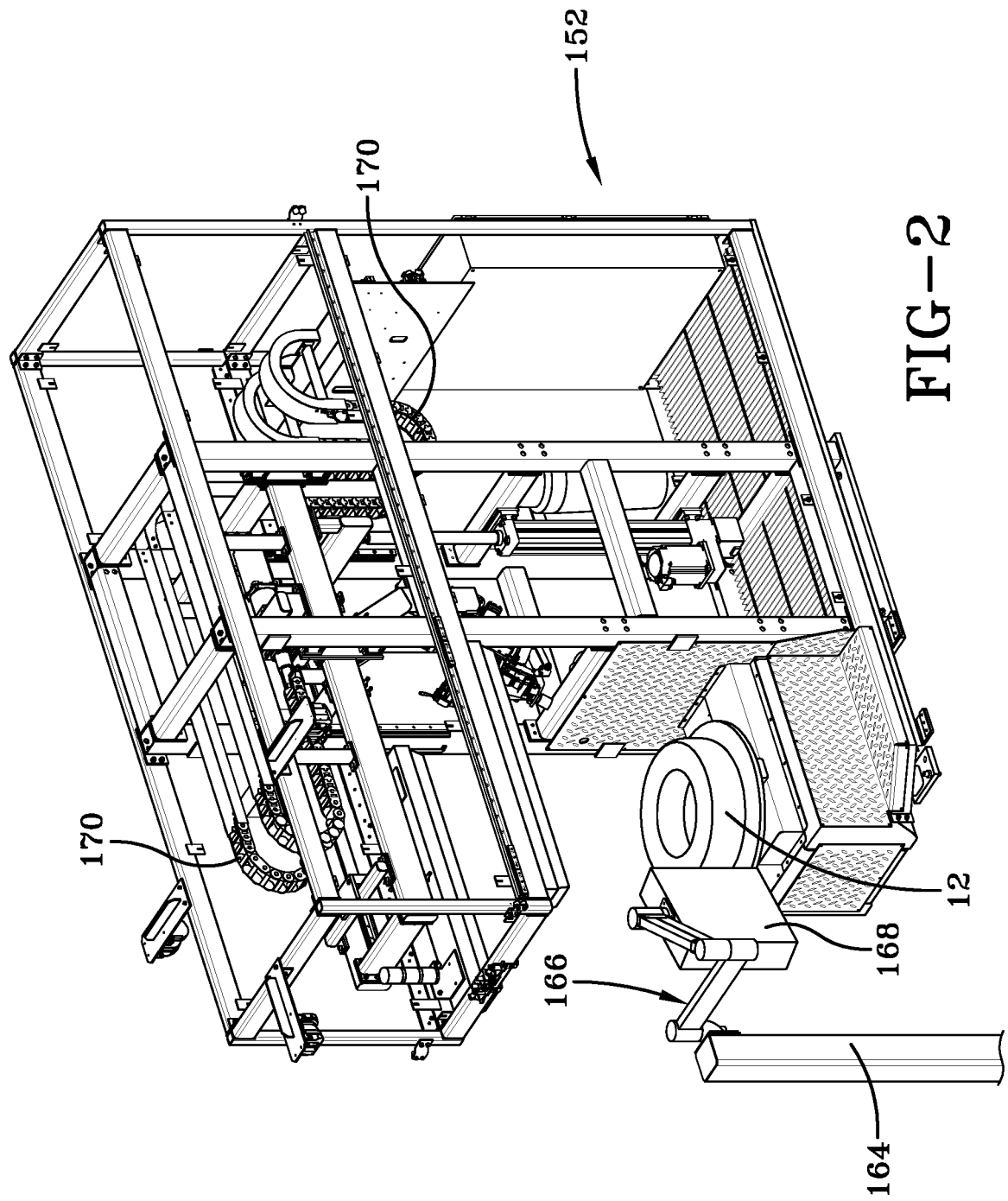
FIG. 2 is a perspective view of Station 2 in the subject assembly, showing dock application and drilling.
Figure 3:
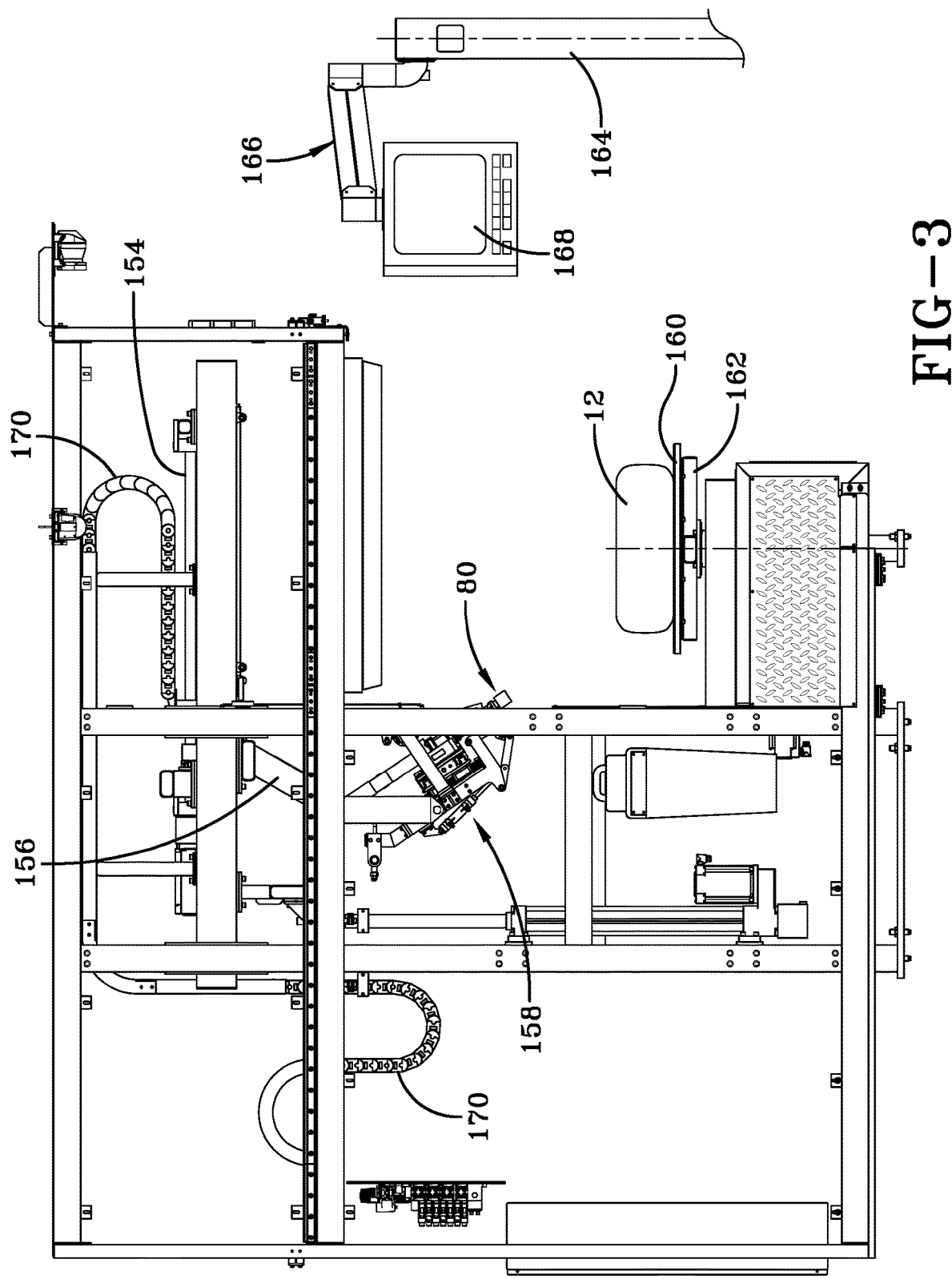
FIG. 3 is a side view of FIG. 1 showing the tire in place and equipment in starting position.
Figure 4:
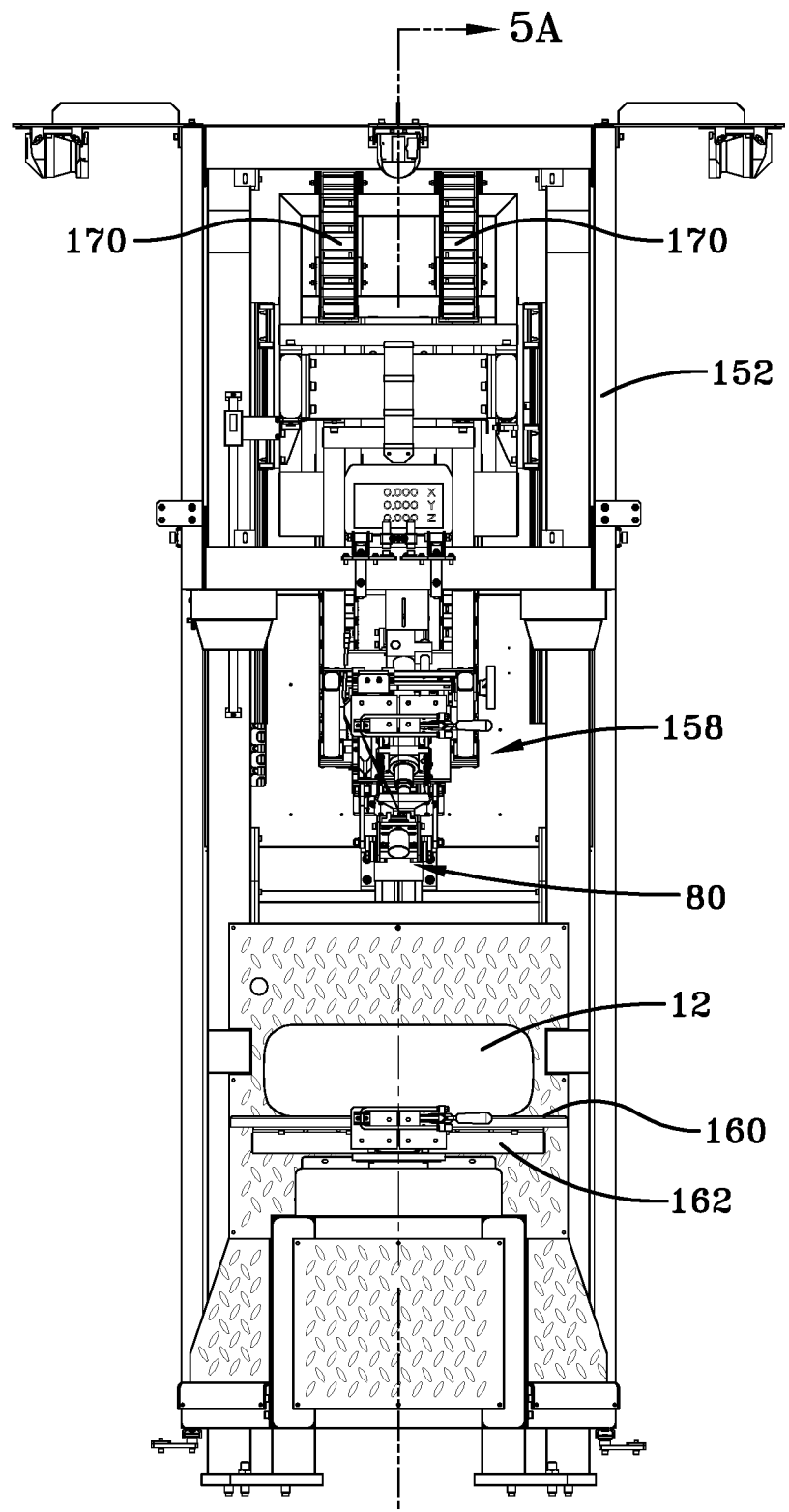
FIG. 4 is a right side view of FIG. 3.
Figure 5A:
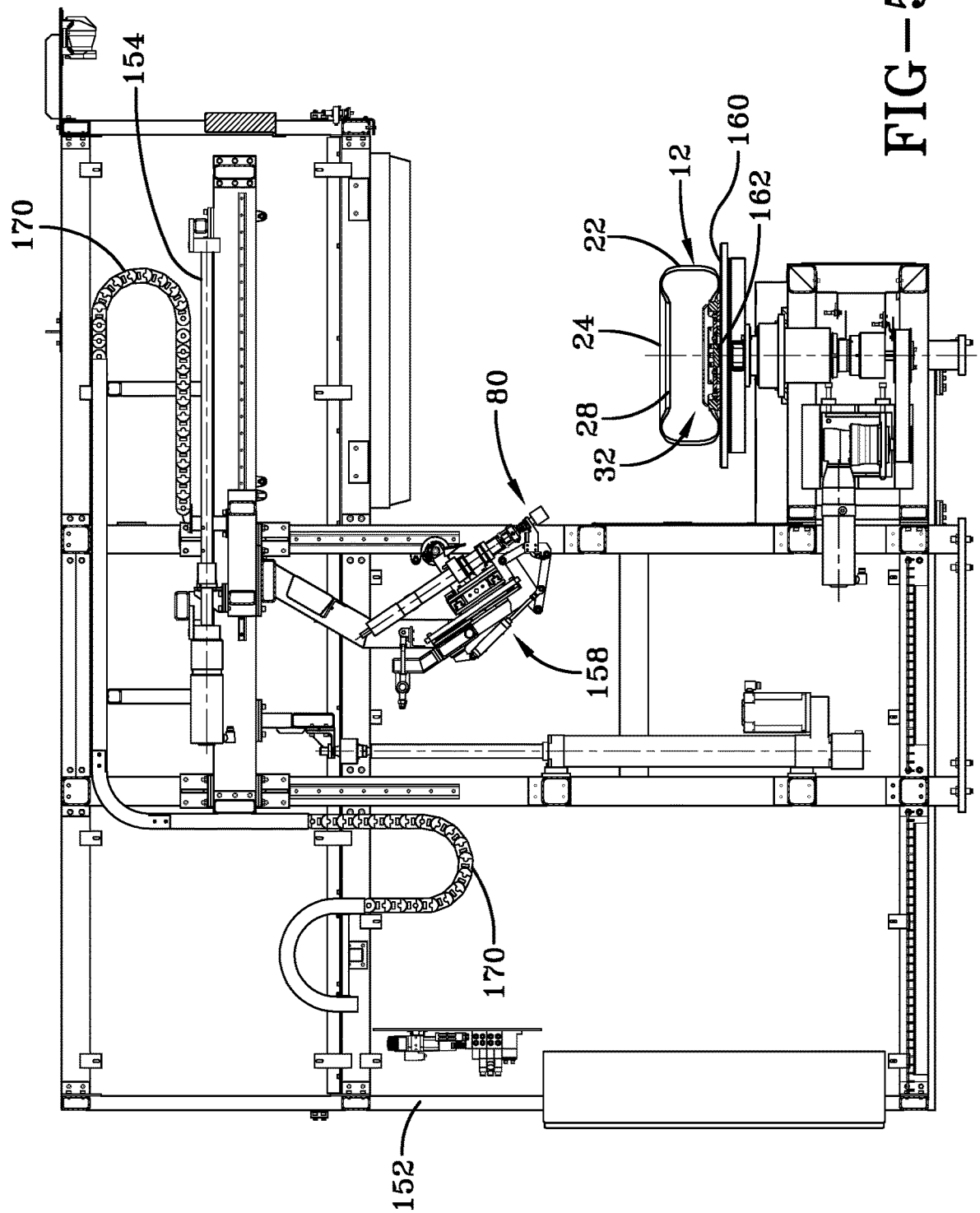
FIG. 5A is a section view taken from FIG. 4 showing the station in starting position.

FIG. 2 is a perspective view of Station-2 in the subject assembly sequence, showing docking station assembly 62 attachment and drilling as described previously. The equipment is mounted to a freestanding frame 152. A robotic arm 156 depends from and is slide mounted to a guide rail 154. The arm 156 reciprocally moves under the influence of an air cylinder (not shown). End-of-arm tooling 158 is connected to arm 156 and is moved thereby into and from a tire during the docking station assembly sequence. A tire-supporting table 160 receives the cured tire 12 thereon and chuck 162 expands to clamp the bead region of the tire, whereby holding the tire in a fixed position. A monitor post 164 supports a linkage 166 providing at a remote end a data entry station 168 for controlling the robotic operation of the station. Flexible cable track 170 connects the sub-assemblies. An air cylinder (not shown) is provided to actuate movement of the robotic arm 156. The robotic arm 156 functions to extend and retract, whereby raising and lowering the end-of-arm tooling 158 carrying end-of-arm assembly 80 toward the tire 12. FIG. 3 is a side view of FIG. 1 showing the tire 12 in place and equipment in starting position. The end-of-arm tooling 158 carrying the end-of-arm assembly 80 is retracted and elevated above the tire 12 positioned upon the support table 160, held in place by chuck 162. FIG. 4 is a right side view of FIG. 3 and FIG. 5A is a section view taken from FIG. 4 showing the station in starting position.

FIG. 5B is a side view of the docking installation station showing the end-of-arm tooling 158 moved into tire location, scanning by means of scanning optics for the tire passage pocket in the tire groove 34 into which the docking station is to be attached. A piston 163 is mounted vertically to the upper frame. The directional arrows in FIG. 5B illustrate two dimensional scanning movement of the head assembly 158 searching for the groove pocket. After the pocket is found, attachment of the docking station assembly 62 proceeds as shown in FIGS. 8A through 8D and described previously.

Figure 9:
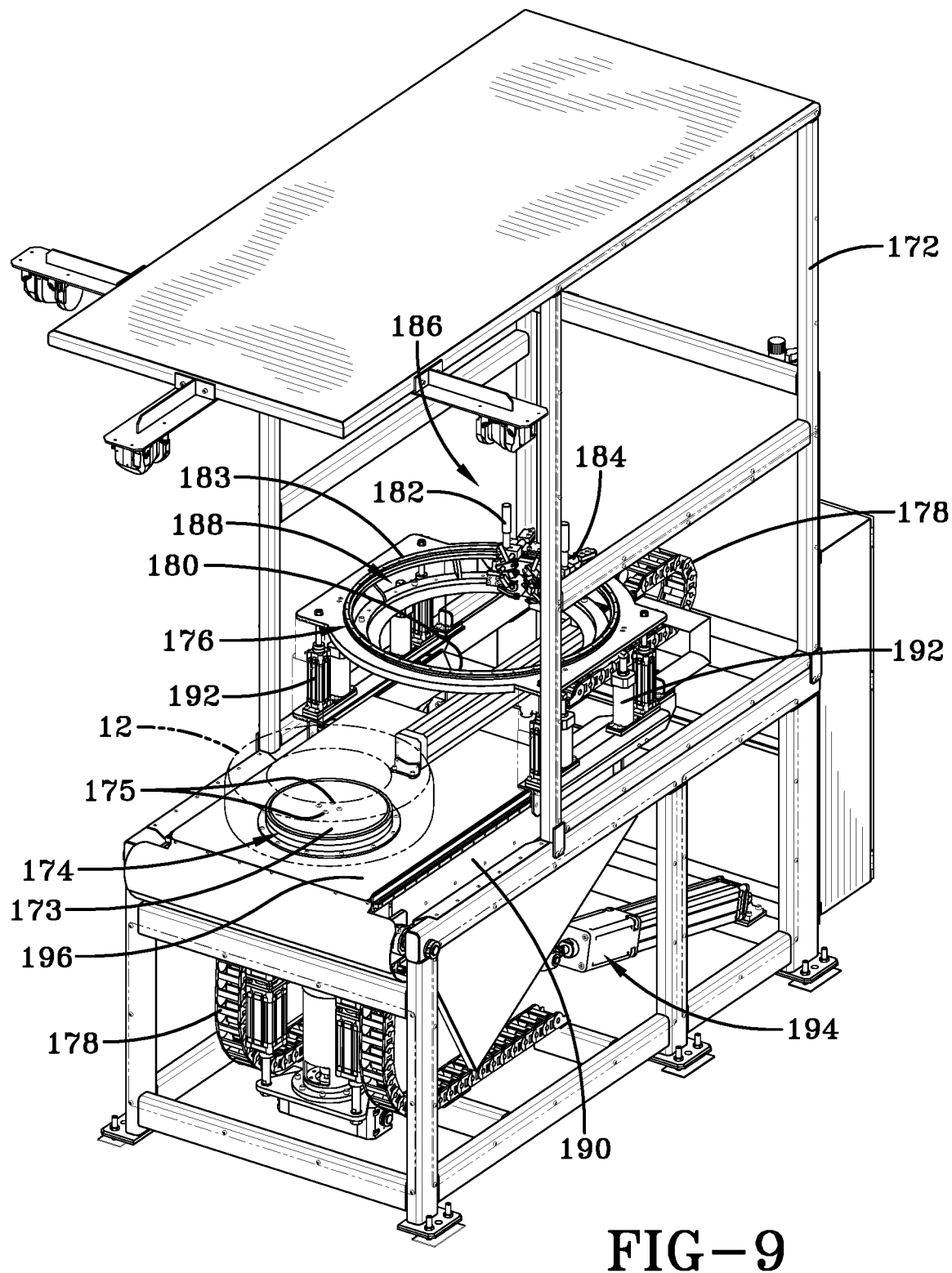
FIG. 9 is a perspective view of the pump assembly installation station.

Assembly of the pump tube 14, inlet device 18, and outlet device 20 is accomplished at an offline station. The completed tube assembly is then fed into and secured within the tire groove 34 in an assembly sequence shown in FIGS. 9 through 14B. FIG. 9 is a perspective view and FIG. 10 an end view of the pump assembly installation station. FIG. 11 is a section view taken from FIG. 10. The station includes a free standing frame or stand 172 and an upraised circular tire centering platform 174 projecting from a tilting table 196. The tire centering platform 174 has four center through-holes 175 in a close center grouping extending into an upper circular top plate 173. A sliding upper assembly 176 is mounted on four legs 192 that extend reciprocally along parallel guide tracks 190 secured to the tilting table 196. The upper assembly 176 moves along the guide tracks 190 between a retracted position (FIG. 12A) and an operative position (FIG. 12B) positioned vertically above the centering platform 174. Flexible cable track 178 connects the sub-assemblies together.

The upper assembly 186 includes a generally inverted frustro-conical post 180 formed having an upper rim plate 183 and a lower plate 181. A pair of tube applicator devices 182, 184 are mounted to the upper rim plate 183 of the post 180. The post 180 forms a centered opening 188. The upper assembly 186 and guide tracks 190 are mounted to a tilt table 196 that operates to tilt a tire-loaded table toward the station operator for ergonomic assistance in attaching the tube assembly to the tire. Tilting is actuated by a pair of piston and cylinder assemblies 194 mounted to the frame 172 as seen in FIGS. 9, 10 and 12A, operable through arm linkages 198.

Figure 10:
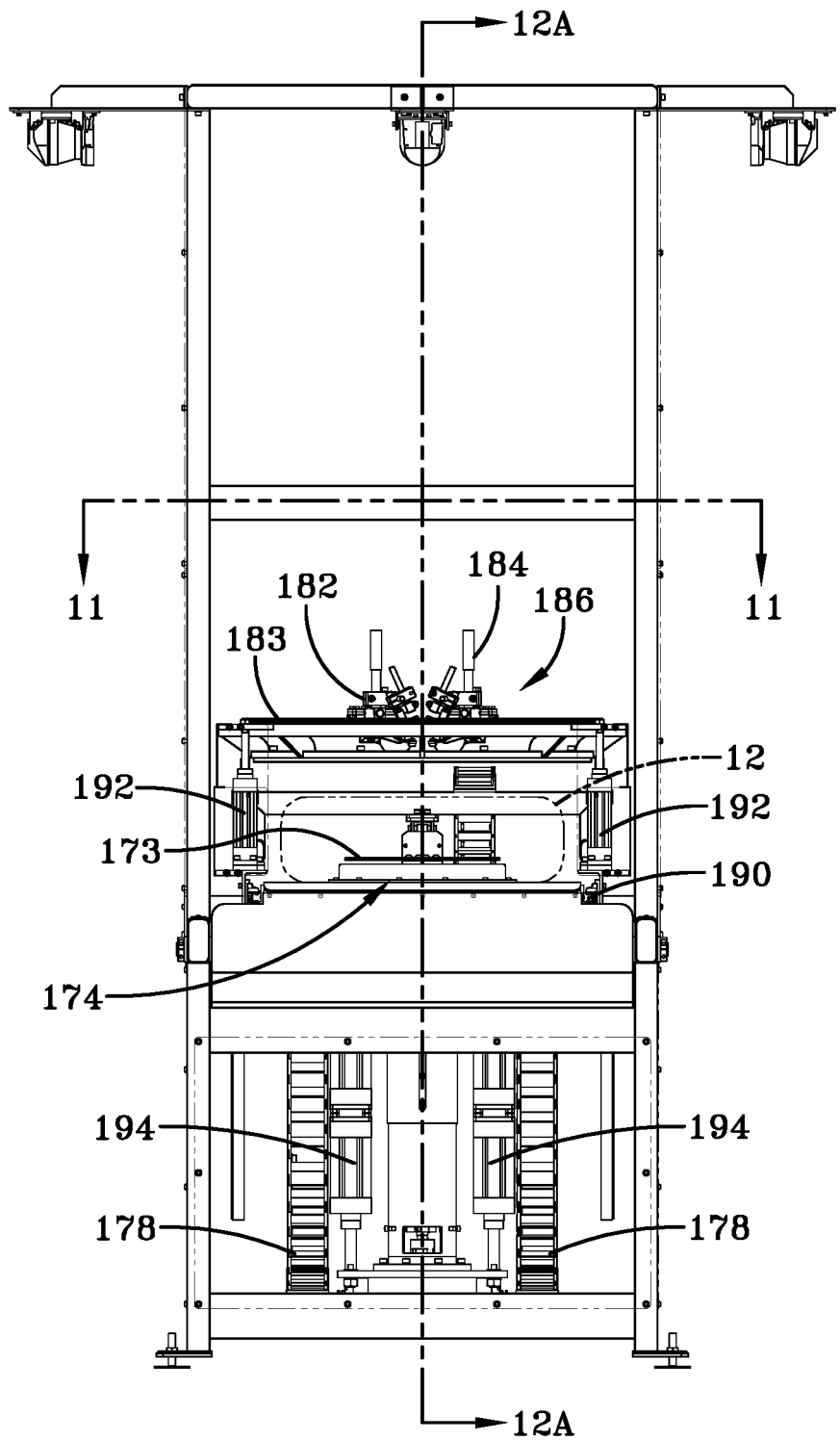
FIG. 10 is an end view of FIG. 9.
Figure 11:
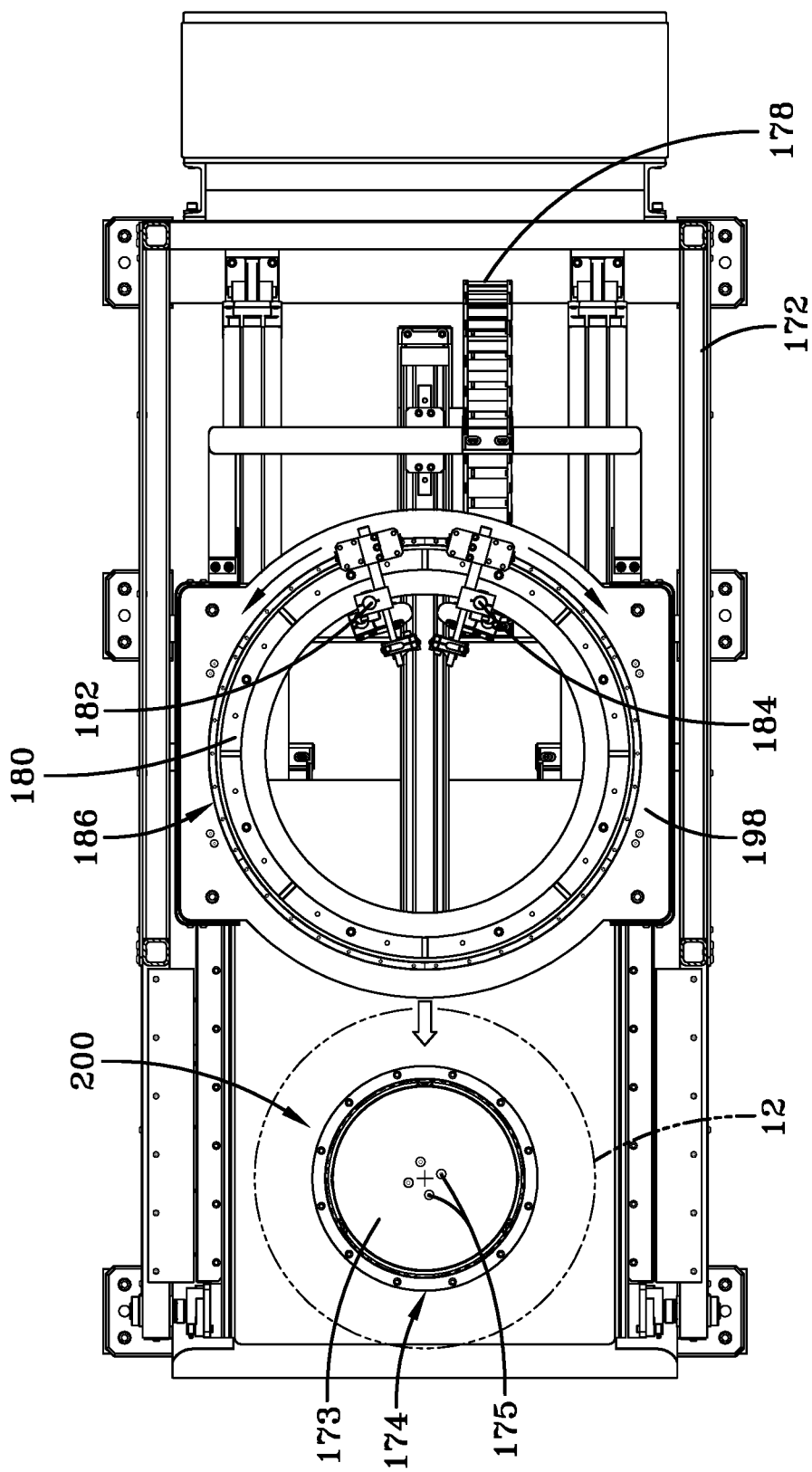
FIG. 11 is a section view taken from FIG. 10.

FIG. 12A is a section view taken from FIG. 10 showing the upper assembly 186 in a retracted position supported by legs 192 within the guide tracks 190 and a tire 12 loaded to the tire mount 174. The tilt table 196 is in a horizontal disposition connected by linkages 198 to the tilt piston and cylinder assemblies 194. FIG. 12B is a section view showing the upper assembly 186 moved into place at the tire 12 axis. FIG. 12C is a section view showing the tire-supporting table 196 in its tilted location. From a position forward to the tilting table, the operator at the station is able to proceed with installation of the pumping tube assembly.

Figure 13B:
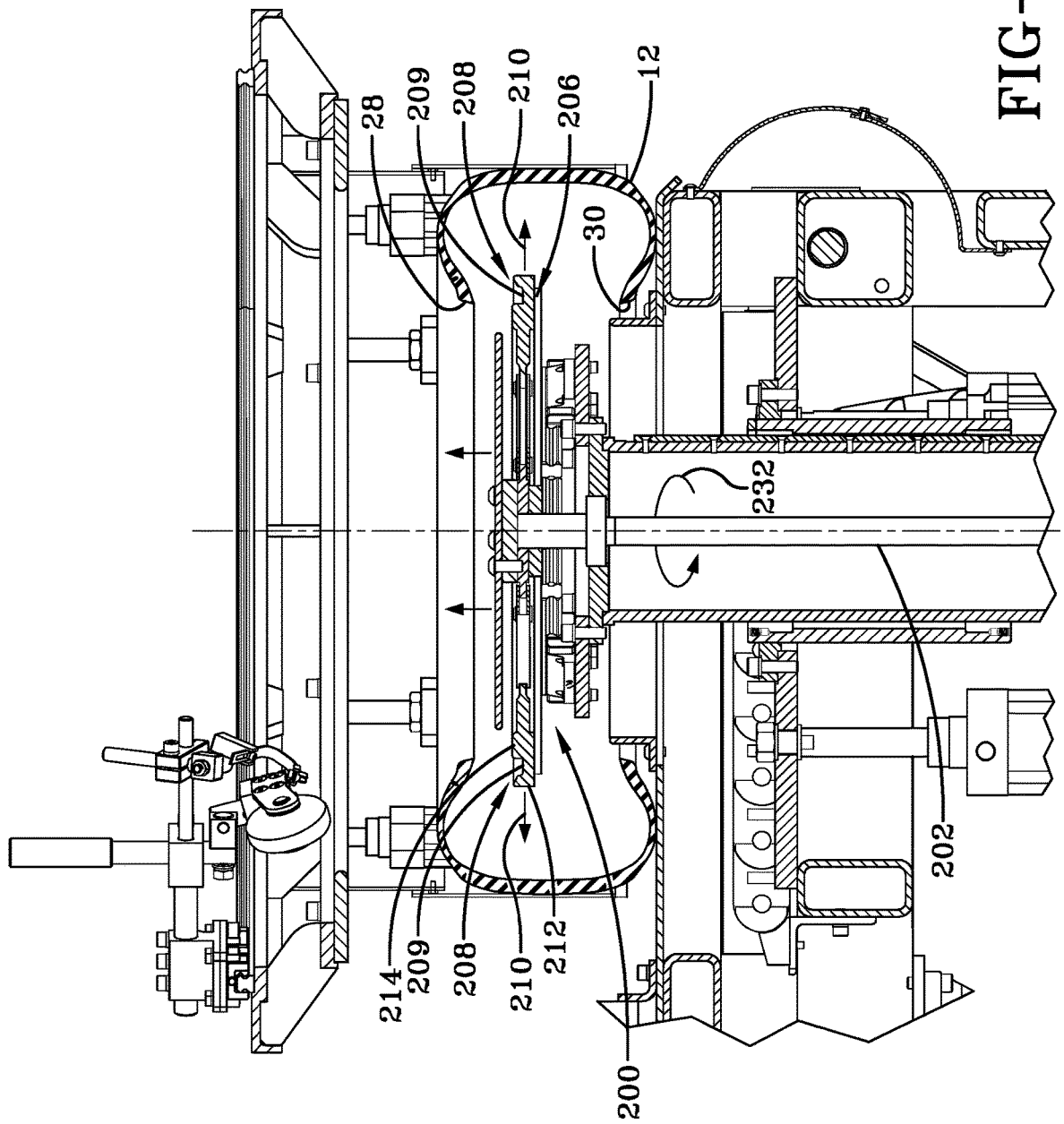
FIG. 13B is a section view showing the expandable chucks raised into inside of the tire.

FIG. 13A is an enlarged section view showing the upper assembly in location over the tire, the tire centered on the inverted frustro-conical post 180. A lower assembly 200 is positioned below the tire mount 174. The lower assembly 200 includes a support rod 202 that moves reciprocally in a vertical direct actuated by a drive cylinder 204. The remote upper end of the support rod 202 is coupled to the upper tire mount plate 179 by hardware affixed through the through-holes 175. Further included in the lower assembly 200 and mounted to the upper end of support rod 202 is a tire gripping chuck assembly 206. The chuck assembly 206 includes an annular outer expandable gripping chucks 208 that move reciprocally in a radial direction between a retracted inward position of reduced radius shown in FIG. 12A and an expanded outward position of expanded radius shown in FIG. 13B. Movement of the expandable chucks 208 between retracted and expanded positions is shown by the directional arrows 210 of FIG. 13B. The expandable chucks 208 are formed having a tire-bead receiving recess or channel 209 formed between an outward beveled chuck wall 212 and an inner chuck stop wall 214. FIG. 13B is a section view showing the expandable chucks 208 raised into inside of the tire 12. Once extended, the chucks 208 receive the bead region 28 of the tire into the channel 209 and hold the tire 12 in position for the installation of the tube assembly.

FIG. 13B shows extension of the support rod 202, raising the tire chuck assembly 206 into centered position within the tire 12. The chucks 208 are in the retracted inward position during insertion. Thereafter, chucks 208 are extended into the radially outward clamping position as shown by directional arrows 210 until clamping engagement between the chucks 208 and the tire bead 28 is established. FIG. 13C is a section view showing the upper assembly 186 pushing downward on the tire sidewall as the lower assembly 200 pushes upward against bead area 18. Forces on the tire generated from the upper and lower assemblies pressure the tire sidewall 24 against the tube applicator devices 182 and 184 (one shown in FIG. 13C).

With reference to FIGS. 13C, 14A and 14B, each of the tube applicator devices 182, 184 is repositionable along a rim flange 216 of the upper plate 183. The devices 182, 184 include a carriage block 218 having a track fitting over the rim flange 216 from which an assembly rod 220 extends. A pivoting locking handle 222 in a locked condition operates to lock the position of the carriage block 218 in a fixed location along the assembly rod 220. Pivoting of the handle 222 to a disengaged condition allows the carriage block 218 to move freely along rod 220. Mounted to a remote end of the assembly rod 220 is a sidewall depressing wheel 223 that is coupled through a linkage 224 to a block 226 rotationally coupled to the rod 220. Rotation of the block 226 about the rod 220 is enabled and disabled by pivotal operation of control handle 228. Rotation of the block 226, and thereby the wheel 223 about the rod 220 controls the extent to which the wheel depends from the upper plate 183 and the location of force application by the wheel 223 upon the tire sidewall 24. Adjustment of the tire sidewall depressing wheel to the size of the tire 12 into which the pumping tube assembly is to be attached is thereby facilitated.

The wheel 223 depends from the upper plate 183 of the upper assembly 186, positioned alongside of the tire 12, and engages with interference the sidewall 24 of the tire 12. As best seen in FIG. 14B, the wheel 223 is positioned proximally to the groove 34 formed within a lower, high flex region, of the tire sidewall. The wheel is thus located above the groove 34 along the sidewall and shares the same high flex region of the sidewall 24. The wheel 223 impinges with interference against the same high flex region of the sidewall 24 as the region occupied by the groove 34 and causes a depression within the tire sidewall. The chucks 208 of the lower assembly 200 moving upwardly combined with the upper assembly 186 carrying the wheel 223 downward, combine to pressure the wheel 223 against the tire sidewall 24 by a requisite level of force necessary to cause the groove 34 to diverge.

As a result of the pressure exerted against the sidewall region adjacent the groove 34 by the wheel 223, the groove 34 is spread apart as indicted by the directional arrows 230 to an extent sufficient to accommodate insertion of the pump tube assembly. As will be appreciated by consideration of FIGS. 13B and 12C, the support rod 202 supporting the lower assembly 200 raises the lower assembly into the tire cavity. Upon extension of the chucks 208, the tire is affixed to the lower assembly 200. The table 196 carrying the lower assembly 200 and the chucked tire 12 is then tilted into an accessible angle to an operator positioned at the front. The rod 202 is further coupled for rotational movement as seen at directional arrow 232. Rotation of the rod 202 rotates the tire 12 relative to the wheels 223 of the tube applicator devices 182, 184. The wheels 223 of the applicators are located to diverge the groove 34 in front of the operator/installer. Once the groove 34 is diverged, the pump tube 14 may be inserted with clearance into the groove 34. As the tire continues to rotate, depressions are created progressively within the tire sidewall 24, causing progressive segments of the groove 34 to diverge and progressive segments of the pump tube 14 to be inserted. The inlet and outlet devices 18, 20 are located at identified enlarged regions of the groove 34 and appropriately inserted into those groove regions. As groove regions occupied by inserted pump tube segments pass the depressing pressure exerted by the wheels 223 of the applicator devices 182, 184, the diverging force on the occupied groove region is eliminated. Upon elimination of the diverging force, the occupied groove is closes as the high flex sidewall region narrows the groove segment to its original width. The pump tube 14 is thereby trapped within the groove 34 segment-by-segment with the rotation of the tire.

From FIG. 14B, it will be noted that the tire 12 is chucked as the toe 234 of the tire sidewall 24 is captured within channel 209 of the chucks 208. The toe 234 of the tire 12 impinges against the rear wall 212 of the chuck recess 209. Chucking of the tire toe anchors the tire sidewall for the spreading of the channel or groove 34. It will further be noted that forward wall 214 defining recess 209 impinges the inner liner 140 of the tire at a position radially opposite the location of the groove 34 within the outer surface of the sidewall 24. Consequently, the forward wall 214 of the chuck acts as a fulcrum supporting the divergence of the groove 34 by the wheel 223. The wheel 223 progressively pressures the tire sidewall 24 segment-by-segment as the tire is rotated on the table 196, causing a commensurate segment-by-segment divergence of the groove 34. As each segment widens, the operator feeds a segment of the tube 14 into the diverged groove segment. When the wheel passes each tube-loaded groove segment, the groove elastomerically closes. Location of the groove 34 within a high flex region of the tire sidewall 24, such as the lower sidewall region shown, facilitates the segment-by-segment divergence of the groove 34 and the segment-by-segment closure of the groove 34 as the wheel passes. Wall or flange 214 of the chuck 208 supports the tire sidewall 24 opposite the groove 34 and acts as a fulcrum as the wheel 223 depresses and bends the tire sidewall 24 inward, causing a maximum widening of the groove 34 for receipt of the pump tube 14. It will further be noted and appreciated that the flexing properties of the high flex region of the tire used by the pumping tube 14 during ultimate air maintenance pumping of air into the tire are the same flexing properties additionally used to widen and close the groove 34 during installation of the pump assembly into the tire sidewall.

From the foregoing, it will be appreciated that an effective and efficient manufacturing apparatus and assembly method is provided for assembling an air maintenance tire 12. An air pumping tube assembly station constructs an air pumping tube sub-assembly. The air pumping tube sub-assembly includes an elongate air pumping tube 14, one or more components of an air inlet device 18 and one or more components of an air outlet device 20. A cured tire is formed having an elongate groove 34 configured to accommodate receipt of the air pumping tube sub-assembly. Enlarged inlet and outlet regions of the elongate groove 34 are formed to respectively accept the inlet device component(s) 18 and the outlet device component(s) 20 of the air pumping tube sub-assembly. Within a pumping tube sub-assembly installation station the pumping tube sub-assembly inserts into the elongate groove 34 with the inlet device component(s) 18 and the outlet device component(s) 20 registered into the enlarged inlet and the enlarged outlet regions of the elongate groove.

The tire 12 as part of the manufacturing system and method is routed through a pressure regulator installation station for installing a pressure regulator (not shown) to a docking station assembly 62. A block 68 is attached to a tire inner liner 140 opposite the outlet device 20 location and acts as a docking station for the air regulator. The docking station block 68 mounts against the tire inner liner 140 surface opposite the outlet region of the elongate groove 34. Robotic drilling apparatus includes optical scanners that seek and find the enlarged outlet region of the groove 34 after the block 68 has been adhered to the inner liner 140. Once located, the drilling head 132 drills through the tire wall and the block 68 to form the dual outlet passageways 68, 70 that feed into the air regulator. The regulator attaches to the docking station block 68 by means of mating connectors that engage sockets 66.

It will further be appreciated that efficient and effective groove-spreading apparatus is provided operative to enlarge the groove 34 segment-by-segment in coordination with a synchronous segment-by-segment insertion of the air pumping tube 14 into the groove 34. The groove-spreading apparatus includes a first moveable chuck 208 operatively engaging and pushing against the toe 234 of the groove-bearing tire sidewall 24 and a depression-inducing device 223, preferably in the form of a force-application wheel, that operates segment-by-segment to engage and depress a region of the sidewall proximate to and above the elongate groove 34 along the sidewall 24. The chuck 208 includes a channel receiving and capturing the tire toe 234 of the tire 12. A forward channel-defining wall 214 creates a flange positioned against the inner liner 140 at a location opposite the groove 34. Thus, as the wheel 223 depresses the sidewall 24 segment-by-segment adjacent the groove 34, the wall 214 acts as a fulcrum opposite the groove 34 to support the force moment created by wheel 223 by which the segment of groove 34 is spread and widened. Location of the groove 34 is preferably at a lower high flex region of the sidewall 24 above the chafer 38. The toe 234 is chucked below the chafer 38. The application of the wheel 223 is proximally above the groove 34 along the sidewall 24 within the same high flex region as that occupied by the groove 34. The groove 34 is opened or widened segment-by-segment in coordination with a synchronous segment-by-segment insertion of the air pumping tube 14 into the groove 34. The rotation of the tire 12 upon the tilt table 196 is operator controlled to assist and coordinate synchronously with the widening of the groove 34 segment-by-segment and the segment-by-segment insertion of the air pumping tube 14 into the groove 34.

Operation of the pumping tube 14 and associated inlet and outlet devices 18, 20, and regulator is described in U.S. Pat. Nos. 8,113,254 and 8,042,586 incorporated herein above by reference. One or both sidewalls 24, 26 may be adapted to incorporate a pumping tube sub-assembly pursuant to the invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of assembling an air maintenance tire, the method comprising the steps of:
constructing an air pumping tube sub-assembly within an air pumping tube assembly station, the air pumping tube sub-assembly comprising: an elongate air pumping tube including an internal air passageway, at least one component of an air inlet device for admitting air into the air passageway of the pumping tube, and at least one component of an air outlet device for conducting pressurized air from the air passageway into an internal air cavity of the air maintenance tire;
moving a cured tire into a tire preparation station, the cured tire including an elongate groove formed to extend from a groove opening into a flexing region of a sidewall of the cured tire, the elongate groove configured to accept the air pumping tube;
activating a tire-modifying apparatus within the tire preparation station to enlarge inlet and outlet regions of the elongate groove for respective receipt of the at least one inlet device component and the at least one outlet device component of the air pumping tube sub-assembly;
installing the air pumping tube sub-assembly into the elongate groove at a pumping tube sub-assembly installation station, the installation operative to register the at least one inlet device component and the at least one outlet device component respectively with the enlarged inlet and the enlarged outlet regions of the elongate groove; and spreading the elongate groove to enlarge the elongate groove to operatively facilitate insertion of the air pumping tube, wherein the step of spreading the elongate groove comprises capturing a tire toe within a chuck channel and pushing a tire-depressing device against a region of the sidewall proximate to the elongate groove.

2. The method of claim 1, further comprising the step of installing a pressure regulator to the at least one outlet device component at a pressure regulator installation station, wherein the at least one outlet device component comprises a docking station having a block body configured for mounting against a tire surface opposite the outlet region of the elongate groove and the docking station block body carrying at least one connector operative to engage and connect to the pressure regulator.

3. The method of claim 2, further comprising the step of drilling at least one tubular air passageway to extend through the block body to the internal air cavity of the air maintenance tire.

* * * * *